US011982501B2

(12) United States Patent
Oda et al.

(10) Patent No.: US 11,982,501 B2
(45) Date of Patent: May 14, 2024

(54) FLOW PATH RESISTOR AND HEAT EXCHANGER

(71) Applicant: Mitsubishi Power, Ltd., Kanagawa (JP)

(72) Inventors: Takuo Oda, Tokyo (JP); Tatsuo Ishiguro, Tokyo (JP); Nobuhide Hara, Tokyo (JP); Yoshiyuki Kondo, Tokyo (JP); Satoshi Hiraoka, Yokohama (JP); Taichi Nakamura, Yokohama (JP); Kenji Kirihara, Yokohama (JP); Jiro Kasahara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 487 days.

(21) Appl. No.: 17/298,850

(22) PCT Filed: Dec. 2, 2019

(86) PCT No.: PCT/JP2019/046969
§ 371 (c)(1),
(2) Date: Jun. 1, 2021

(87) PCT Pub. No.: WO2020/116378
PCT Pub. Date: Jun. 11, 2020

(65) Prior Publication Data

US 2022/0034606 A1 Feb. 3, 2022

(30) Foreign Application Priority Data

Dec. 3, 2018 (JP) ................................ 2018-226755

(51) Int. Cl.
*F28F 13/12* (2006.01)
*F15D 1/06* (2006.01)
(Continued)

(52) U.S. Cl.
CPC .............. *F28F 13/12* (2013.01); *F15D 1/065* (2013.01); *F28D 7/06* (2013.01); *F28F 1/40* (2013.01)

(58) Field of Classification Search
CPC .......... Y10T 137/2562; F16L 55/02736; F15D 1/0005; B01F 25/4233; B01F 25/4231; B01F 25/4521
(Continued)

(56) References Cited

U.S. PATENT DOCUMENTS 3,045,984 A * 7/1962 Cochran ............. B01F 25/4233 138/42
3,586,104 A * 6/1971 Hyde ...................... E21B 49/08 166/162
(Continued)

FOREIGN PATENT DOCUMENTS

CN 104501643 4/2015
CN 108463684 8/2018
(Continued)

OTHER PUBLICATIONS

International Search Report issued Dec. 24, 2019 in International (PCT) Application No. PCT/JP2019/046969, with English-language translation.
(Continued)

*Primary Examiner* — Patrick F Brinson
(74) *Attorney, Agent, or Firm* — Wenderoth, Lind & Ponack, L.L.P.

(57) ABSTRACT

A plurality of resistance-imparting portions (34A to 34E) are disposed adjacent to each other. A first contraction flow portion forming one of the resistance-imparting portions (34A to 34E) adjacent to each other is in communication with an enlarged diameter portion forming another resistance-imparting portion. First contraction flow portions
(Continued)

(32AH to 32DH) forming the resistance-imparting portions (34A to 34E) adjacent to each other are disposed at different positions in a direction in which an outer frame member (31) extends.

14 Claims, 29 Drawing Sheets

(51) Int. Cl.
*F28D 7/06* (2006.01)
*F28F 1/40* (2006.01)

(58) Field of Classification Search
USPC ................ 138/42, 39, 37; 366/336–338, 340
See application file for complete search history.

(56) References Cited

U.S. PATENT DOCUMENTS

| | | | | | |
|---|---|---|---|---|---|
| 3,754,398 | A * | 8/1973 | Mattavi | F01N 3/26 | 165/902 |
| 4,438,075 | A * | 3/1984 | von Branchel | B01D 47/12 | 422/647 |
| 4,607,689 | A | 8/1986 | Mochida et al. | | |
| 4,724,904 | A | 2/1988 | Fletcher et al. | | |
| 5,829,246 | A * | 11/1998 | Abrams | F15D 1/065 | 60/761 |
| 6,523,572 | B1 * | 2/2003 | Levin | F15D 1/0005 | 366/337 |
| 7,866,345 | B2 * | 1/2011 | Lowery | G01F 1/42 | 138/42 |
| 9,038,669 | B2 * | 5/2015 | Kumar | F16L 55/02718 | 73/707 |
| 2006/0108014 | A1 * | 5/2006 | Marsh | F16L 55/02736 | 138/42 |
| 2007/0137851 | A1 | 6/2007 | Hamada et al. | | |
| 2008/0251245 | A1 | 10/2008 | Gorbounov et al. | | |
| 2013/0019981 | A1 * | 1/2013 | Yandle, II | B61D 5/06 | 137/590 |
| 2019/0017756 | A1 | 1/2019 | Koyama et al. | | |

FOREIGN PATENT DOCUMENTS

| | | |
|---|---|---|
| DE | 3024819 | 1/1982 |
| JP | 52-21435 | 2/1977 |
| JP | 54-5109 | 1/1979 |
| JP | 55-35518 | 8/1980 |
| JP | 60-43880 | 3/1985 |
| JP | 60-117406 | 8/1985 |
| JP | 2008-51479 | 3/2008 |
| JP | 2016-215192 | 12/2016 |
| JP | 2018-189352 | 11/2018 |

OTHER PUBLICATIONS

Written Opinion of the International Searching Authority issued Dec. 24, 2019 in International (PCT) Application No. PCT/JP2019/046969, with English-language translation.

* cited by examiner

FLOW PATH RESISTOR AND HEAT EXCHANGER

TECHNICAL FIELD

The present invention relates to a flow path resistor and a heat exchanger.

This application claims priority based on Japanese Patent Application No. 2018-226755 filed in Japan on Dec. 3, 2018, the contents of which are incorporated herein by reference.

BACKGROUND ART

In gas turbines, heat exchange is performed using a heat exchanger between air that cools vanes and a fuel gas to achieve energy saving.

A multi-tube heat exchanger, called a shell and tube type, for example, is known as the heat exchanger.

The multi-tube heat exchanger includes a cylindrical casing, a plurality of heat transfer tubes having an inverted U-shape, a tube support plate that supports both end portions of the plurality of heat transfer tubes, a cooling water supply chamber communicating with one-side ends of the plurality of heat transfer tubes and being supplied with cooling water, and a cooling water collection chamber communicating with the other-side ends of the plurality of heat transfer tubes and collecting cooling water.

The tube support plate is formed with through-holes into which the one-side ends and the other-side ends of the plurality of heat transfer tubes are inserted.

The cooling water flowing through the plurality of heat transfer tubes is extracted from a compressor and exchanges heat with a compressed gas guided into the casing. As a result, the compressed gas is cooled.

Patent Document 1 discloses a structure for mixing a fluid in a tube.

CITATION LIST

Patent Literature

Patent Document 1: JP 2016-215192 A

SUMMARY OF INVENTION

Technical Problem

Among the one-side ends of the plurality of heat transfer tubes, cooling water tends to be introduced at a high pressure into the one-side ends of the heat transfer tubes disposed in a central position of the tube support plate, and cooling water tends to be introduced at a low pressure to the one-side ends of the heat transfer tubes disposed in an outer peripheral portion of the tube support plate.

Furthermore, in the heat transfer tubes in which cooling water is introduced at a low pressure, the cooling water may evaporate due to heat exchange with compressed gas before reaching the other-side ends of the heat transfer tubes, and flow back to the one end sides of the heat transfer tubes.

The structure disclosed in Patent Document 1 is not a structure in consideration of adding resistance to cooling water, so it is difficult to suppress backflow of cooling water even when the structure is applied to a heat transfer tube.

In addition, the flow path resistor that adds resistance to cooling water (fluid) preferably has a small occupancy area and is small in size.

Therefore, an object of the present invention is to provide a flow path resistor capable of suppressing backflow of a fluid in a small occupancy area, and a heat exchanger.

Solution to Problem

In order to solve the above-described problems, a flow path resistor according to one aspect of the present invention includes: an outer frame member configured to partition a fluid introduction port formed at one end of the outer frame member, the fluid introduction port being configured to introduce fluid, a fluid lead-out port formed at another end of the outer frame member, the fluid lead-out port being configured to draw the fluid out, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, in which the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends.

According to the present invention, a plurality of resistance-imparting portions are provided which are disposed inward of an outer surface of the outer frame member and include a first contraction flow portion through which the fluid passes, and an enlarged diameter portion in communication with the first contraction flow portion. Among the plurality of resistance-imparting portions adjacent to each other, the first contraction flow portion and the enlarged diameter portion forming another resistance-imparting portion are communicated to repeatedly add resistance to the fluid. As a result, a fluid having a high pressure can be drawn out from the fluid lead-out port, and backflow of the fluid drawn out from the fluid lead-out port can be suppressed.

Further, the first contraction flow portions forming the resistance-imparting portions adjacent to each other are disposed at different positions in a direction in which the outer frame member extends so that a fluid flow path formed in the flow path resistor has a winding shape.

As a result, the flow path of the fluid can be lengthened, and the fluid can collide with the inner surface of the outer frame member to further add resistance to the fluid.

Thus, even if the length of the flow path resistor (the length of the outer frame member) is decreased, it is possible to add a large resistance to the fluid. Therefore, backflow of the fluid can be suppressed in a small occupancy area.

Further, in the flow path resistor according to one aspect of the present invention, the plurality of resistance-imparting portions may be disposed in a direction in which the outer frame member extends; a plurality of split plates that split the hollow portion with respect to the direction in which the outer frame member extends may be provided in the outer frame member; one of the split plates adjacent to each other may be formed with the first contraction flow portion constituting the one resistance-imparting portion; the other split plate may be formed with the first contraction flow portion constituting the other resistance-imparting portion; and the diameter expanding portion may be disposed between the split plates adjacent to each other.

In this manner, a plurality of dividing plates that divide the hollow portion with respect to the direction in which the outer frame member extends are provided, the enlarged diameter portion is disposed between the dividing plates adjacent to each other, one of the dividing plates adjacent to each other is formed with the first contraction flow portion forming the one resistance-imparting portion; and the other dividing plate is formed with the first contraction flow portion forming the other resistance-imparting portion. Therefore, it is possible to dispose the plurality of resistance-imparting portions in the direction in which the outer frame member extends.

With such a configuration, even if the length of the flow path resistor (the length of the outer frame member) is decreased, it is possible to add a large resistance to the fluid. Therefore, backflow of the fluid can be suppressed in a small occupancy area.

In the flow path resistor according to one aspect of the present invention, the fluid introduction port and the fluid lead-out port may be sized to function as contraction flow portions that contract the flow of the fluid; the fluid introduction port may constitute a portion of the resistance-imparting portion disposed on one end of the outer frame member of the plurality of resistance-imparting portions; and the fluid lead-out port may constitute a portion of the resistance-imparting portion disposed on the other end portion of the outer frame member of the plurality of resistance-imparting portions.

In this manner, the fluid introduction port and the fluid lead-out port are sized to function as contraction flow portions that contract the flow of the fluid. Thus, each of the resistance-imparting portions disposed in the direction in which the outer frame member extends can be configured to have the contraction flow portion (including the first contraction flow portion) and the enlarged diameter portion.

In the flow path resistor according to one aspect of the present invention, at least one of the split plates adjacent to each other may be provided with a rib that narrows a flow path of the fluid flowing through the diameter expanding portion.

By providing the rib that narrows the flow path of the fluid flowing through the enlarged diameter portion in this manner, the fluid flowing through the enlarged diameter portion can collide with the rib, and the fluid can be added with resistance when the fluid passes through the flow path narrowed by the rib.

As a result, even if the length of the flow path resistor (the length of the outer frame member) is further decreased, it is possible to add a large resistance to the fluid. Therefore, backflow of the fluid can be suppressed in a small occupancy area.

In the flow path resistor according to one aspect of the present invention, the split plates adjacent to each other may be provided with at least one partitioning plate that splits the diameter expanding portion; and the partitioning plate may be formed with a second contraction flow portion that contracts the flow of the fluid.

In this manner, the dividing plates adjacent to each other are provided with at least one partitioning plate that divides the enlarged diameter portion, and the partitioning plates are formed with a second contraction flow portion that contracts the flow of the fluid. Thus, it is possible to add resistance to the fluid when the fluid passes through the second contraction flow portion.

As a result, even if the length of the flow path resistor (the length of the outer frame member) is further decreased, it is possible to add a large resistance to the fluid. Therefore, backflow of the fluid can be suppressed in a small occupancy area.

Further, in the flow path resistor according to an aspect of the present invention, the plurality of resistance-imparting portions may extend in the direction in which the outer frame member extends and may be disposed in a circumferential direction of the outer frame member; the plurality of resistance-imparting portions each may include: a first partitioning plate disposed on a side of the fluid introduction port and formed with the first contraction flow portion; and a second partitioning plate disposed on a side of the fluid lead-out port and formed with the first contraction flow portion; the first and second partitioning plates may split the diameter expanding portion extending in the direction in which the outer frame member extends; a circumferential direction of the diameter expanding portion may be defined by a plate member disposed in the circumferential direction of the outer frame member; and the fluid flowing through the resistance-imparting portions may flow through the first partitioning plate or the second partitioning plate and then flows within other resistance-imparting portions adjacent to the resistance-imparting portions.

With such a configuration, it is possible to form a flow path portion extending from one end of the outer frame member toward the other end and a flow path portion including a flow path portion extending from the other end of the outer frame member toward the one end.

As a result, even if the length of the flow path resistor (the length of the outer frame member) is decreased, it is possible to add a large resistance to the fluid. Therefore, backflow of the fluid can be suppressed in a small occupancy area.

In the flow path resistor according to one aspect of the present invention, at least one third partitioning plate may be disposed between the first partitioning plate and the second partitioning plate, and the third partitioning plate may be formed with the first contraction flow portion.

In this manner, at least one third partitioning plate is disposed between the first partitioning plate and the second partitioning plate, and the third partitioning plate is formed with the first contraction flow portion. Thus, it is possible to further add resistance to the fluid. As a result, fluid backflow can be suppressed in a smaller occupancy area.

In the flow path resistor according to an aspect of the present invention, the fluid lead-out port may be disposed in a central portion of the other end of the outer frame member.

The fluid lead-out port is disposed in a central portion of the other end of the outer frame member in this manner, so that collision of the fluid on the outer frame member can be suppressed, and erosion can be suppressed.

Further, the fluid lead-out port is disposed in a central portion of the other end of the outer frame member, and thus the direction of movement of the fluid drawn out from the fluid lead-out port can be made the same as the direction in which the outer frame member extends.

Further, in the flow path resistor according to an aspect of the present invention, the flow path resistor may include a protruding portion that is provided on an outer peripheral surface of the outer frame member positioned on the one end, and the protruding portion protrudes from the outer peripheral surface to an outer side of the outer frame member.

In this manner, the flow path resistor may include a protruding portion that is provided on an outer peripheral surface of the outer frame member positioned on the one end side, and that protrudes from the outer peripheral surface to an outer side of the outer frame member, thereby allowing the protruding portion to function as a stopper that regulates the position of the flow path resistor with respect to the tubular member, for example, when the flow path resistor is mounted inside the end portion of the tubular member.

In addition, it is possible to dispose the protruding portion on the outer side of the tubular member, in a state in which the outer frame member is disposed inside the end portion of the tubular member, thereby making it possible to easily attach/detach the flow path resistor to/from the tubular member.

The flow path resistor according to one aspect of the present invention may further include first inclined plates housed within the outer frame member and disposed at intervals in the one direction, the first inclined plates being formed with the first contraction flow portion; and second inclined plates housed within the outer frame member and disposed at intervals in the one direction, the second inclined plates being formed with the second contraction flow portion. The plurality of first inclined plates may be disposed inclined to the one direction; the plurality of second inclined plates may be inclined to a direction different from the first inclined plate; the diameter expanding portion may be defined by the first inclined plate, the second inclined plate, and an inner surface of the outer frame member; a plurality of the diameter expanding portions may be formed; and the first and second contraction flow portions may be in communication with the diameter expanding portions.

With such a configuration, a plurality of the first contraction flow portions, a plurality of the second contraction flow portions, and a plurality of the enlarged diameter portions are formed in the outer frame member. As a result, backflow of the fluid can be suppressed in a small occupancy area.

In addition, the first and second inclined plates are inclined to the one direction in which the outer frame member extends, and thus the strength of the first and second inclined plates can be improved when the flow path resistor is manufactured using, for example, a 3D printer.

In the flow path resistor according to one aspect of the present invention, the second inclined plate may be connected to the first inclined plate disposed in the one direction.

In this manner, the second inclined plate is connected to the first inclined plate disposed in the one direction, and thus the strength of the structure formed from the first and second inclined plates can be improved.

Additionally, as compared with a case where the second inclined plate and the first inclined plate disposed in the one direction are disposed apart from each other in the tubular member, a large number of the enlarged diameter portion, a large number of the first contraction flow portion, and a large number of the second contraction flow portion can be formed, which makes it possible to add a large resistance to the fluid.

Further, in the flow path resistor according to one aspect of the present invention, the plurality of second inclined plates may be disposed away from the first inclined plates disposed in the one direction.

Also, with such a configuration, it is possible to add resistance to the fluid. Thus, backflow of the fluid can be suppressed in a small occupancy area.

In addition, in the flow path resistor according to one aspect of the present invention, the first contraction flow portion and the second contraction flow portion may be formed at different positions in a plan view from the fluid lead-out port side.

In this manner, the first contraction flow portion and the second contraction flow portion are formed at different positions in a plan view from the fluid lead-out port side, thereby making it possible to increase the fluid flow path. Thus, a large resistance can be added to the fluid.

In addition, in the flow path resistor according to one aspect of the present invention, a rib is provided on at least one of the first and second inclined plates.

In this manner, a rib is provided on at least one of the first and second inclined plates, thereby making it possible to narrow a portion of the flow path by the rib. As a result, resistance can be added to the fluid as it passes through the rib.

In order to solve the above-described problems, a heat exchanger according to one aspect of the present invention includes the flow path resistor described above, a cylindrical casing having a gas introduction port for introducing a gas and a gas lead-out port for drawing out the gas, a tube support plate disposed at a bottom portion of the casing and formed with a plurality of first and second through-holes, a planar member that is provided between the tube support plate and a bottom portion of the casing and that separates a cooling water supply chamber that exposes a plurality of the first through-holes and a cooling water collection chamber that exposes a plurality of the second through-holes from each other, a plurality of heat transfer tubes each having one end portion inserted into the first through-hole and the other end portion inserted into the second through-hole, the heat transfer tubes being each formed in an inverted U-shape, a cooling water introduction port provided in the casing and introducing cooling water, which is the fluid, to the cooling water supply chamber, and a cooling water lead-out port provided in the casing and drawing out the cooling water from the cooling water collection chamber. The flow path resistor is mounted in the one end portion of the heat transfer tube from one end side of the heat transfer tube, among the plurality of heat transfer tubes.

According to the present invention, among a plurality of the heat transfer tubes, the flow path resistor is mounted in one end portion of the heat transfer tube from one end side of the heat transfer tube, thereby making it possible to supply cooling water (cooling water having a high pressure), which is a fluid to which resistance is added, into the heat transfer tubes.

As a result, evaporation of the cooling water caused by heat exchange with the gas can be suppressed and, therefore, backflow of the cooling water in the heat transfer tubes can be suppressed.

In addition, by disposing the flow path resistor in the one end portions of the heat transfer tubes, it is not necessary to separately secure the region where the flow path resistor is installed, thereby making it possible to reduce the area occupied by the flow path resistor.

In the heat exchanger according to one aspect of the present invention, the flow path resistor may be provided in the plurality of heat transfer tubes, and the flow path resistors mounted in the one end portions of the plurality of heat transfer tubes may vary in number of the resistance-imparting portions forming the flow path resistor depending on a pressure of the cooling water introduced into the one end portions of the heat transfer tubes.

In this manner, the number of the resistance-imparting portions forming the flow path resistors are varied depending on a pressure of the cooling water introduced into the one end portions of the heat transfer tubes, so that variations in difference in pressure of the fluid flowing in the plurality of heat transfer tubes can be reduced.

Advantageous Effects of Invention

According to the present invention, backflow of the fluid can be suppressed in a small occupancy area.

DESCRIPTION OF EMBODIMENTS

Embodiments in which the present invention is applied will be described in detail below with reference to the drawings.

First Embodiment

A heat exchanger 10 according to a first embodiment of the present invention will be described with reference to FIGS. 1 to 3.

Figure 1:
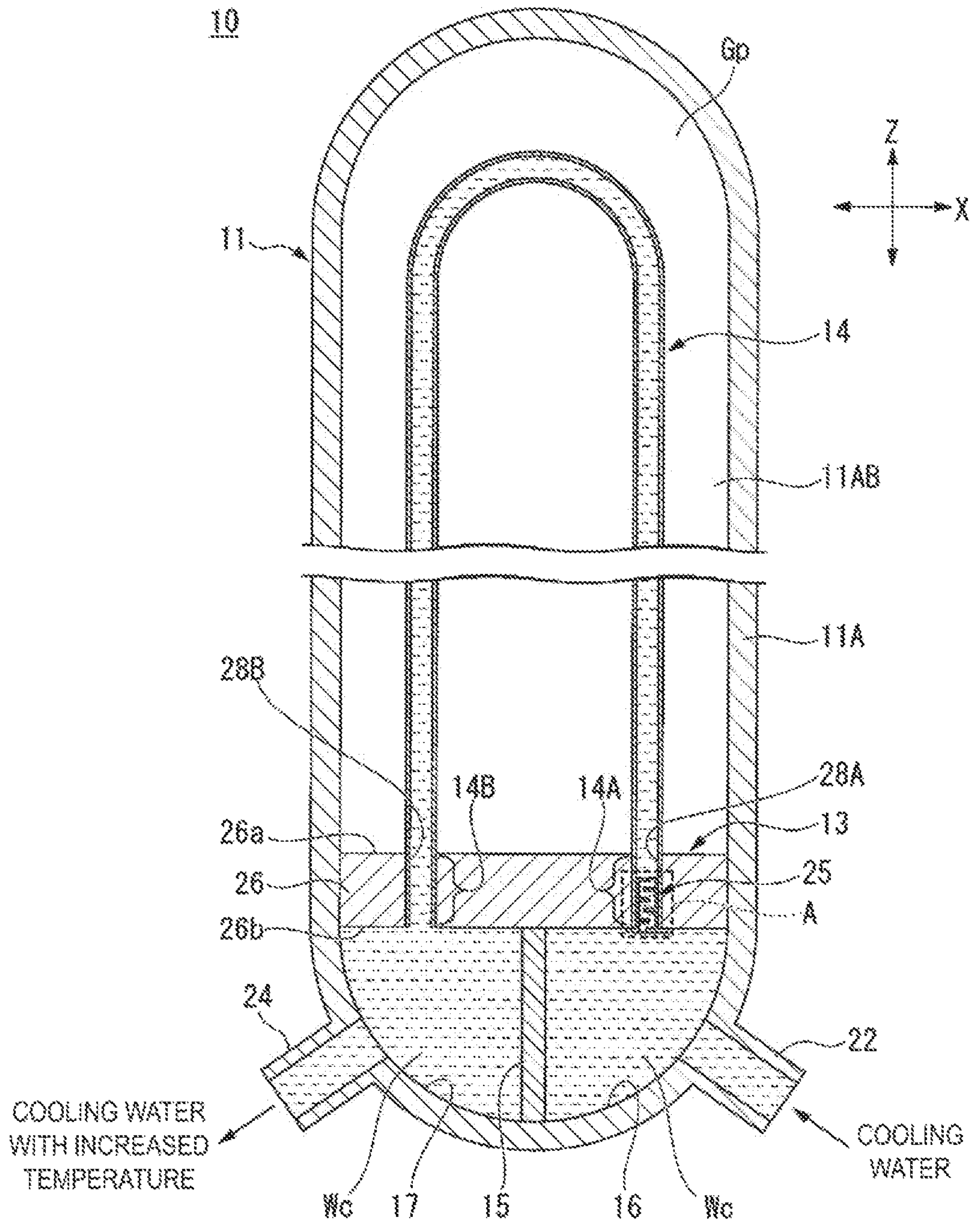
FIG. 1 is a cross-sectional view illustrating a schematic configuration of a heat exchanger according to a first embodiment of the present invention.
Figure 2:
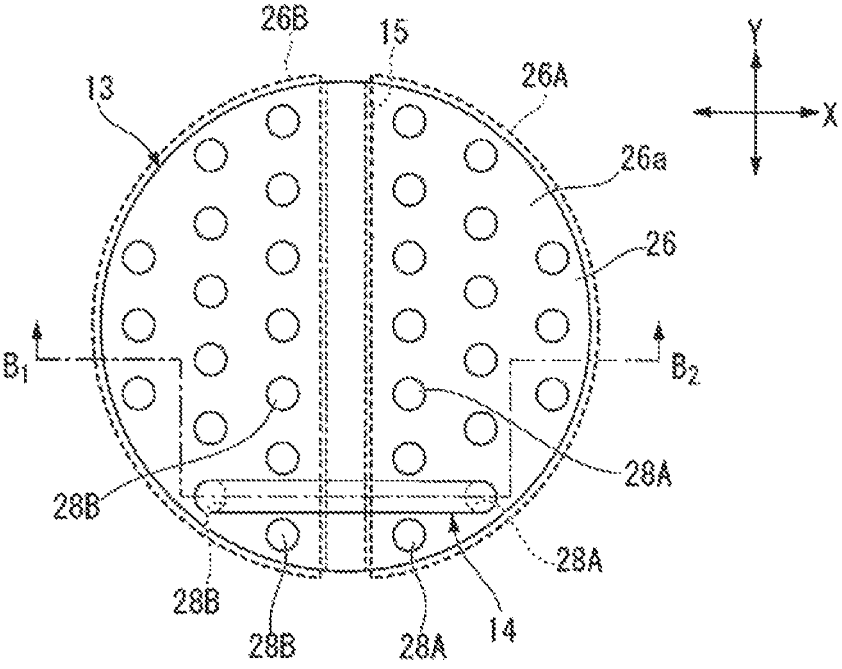
FIG. 2 is a plan view of an upper surface side of the tube support plate illustrated in FIG. 1.

FIG. 1 corresponds to a cross section taken along the line $B_1$-$B_2$ illustrated in FIG. 2. In FIG. 1, from the viewpoint of making the drawing easier to see, only one heat transfer tube 14 of a plurality of heat transfer tubes 14. The heat transfer tube 14 illustrated in FIG. 1 has end portions (one end portion 14A and the other end portion 14B) inserted into first and second through-holes 28A and 28B formed in the outer peripheral portion of a tube support plate 13.

In FIG. 1, a Z direction indicates a direction in which an outer frame member 31 extends (a height direction of a heat exchanger 10), the X direction indicates a direction in which a cooling water supply chamber 16 and a cooling water collection chamber 17 face each other, Gp indicates a compressed gas (hereinafter referred to as "compressed gas Gp"); and Wc indicates cooling water (hereinafter referred to as "cooling water Wc").

In FIG. 2, a Y direction indicates a direction orthogonal to the X direction and the Z direction illustrated in FIG. 1. In FIG. 1 to FIG. 3, the same reference signs are assigned to the same constituent components.

Note that, in a first embodiment, an example will be given of a heat exchanger 10 that cools a compressed gas Gp compressed by a compressor forming a gas turbine with cooling water Wc, which is a fluid.

The heat exchanger 10 includes a casing 11, a tube support plate 13, a plurality of heat transfer tubes 14, a planar member 15, a cooling water supply chamber 16, a cooling water collection chamber 17, a cooling water introduction port 22, a cooling water lead-out port 24, and a flow path resistor 25.

The casing 11 has a casing main body 11A, a gas introduction port (not illustrated), and a gas lead-out port (not illustrated).

The casing main body 11A has a cylindrical shape and extends in the Z direction. A space 11AB is formed in the casing main body 11A.

The gas introduction port (not illustrated) is provided in the casing main body 11A positioned above the tube support plate 13. The gas introduction port (not illustrated) introduces the compressed gas Gp into the space 11AB formed above the tube support plate 13.

A gas lead-out port (not illustrated) is provided in the casing main body 11A positioned above the tube support plate 13. The gas lead-out port (not illustrated) draws out the compressed gas Gp cooled by heat exchange with the cooling water Wc flowing in the plurality of heat transfer tubes 14, from the space 11AB formed above the tube support plate 13. The cooled compressed gas Gp is supplied to a place where the compressed gas Gp is used (not illustrated).

The tube support plate 13 includes a support plate main body 26, a plurality of first through-holes 28A, and a plurality of second through-holes 28B.

The support plate main body 26 is a plate member having a circular shape. The support plate main body 26 is disposed at a bottom of the casing main body 11A such that a space is formed between the support plate main body 26 and a bottom surface in the casing main body 11A.

The support plate main body 26 has an upper surface 26*a* that comes into contact with the compressed gas Gp introduced into the casing main body 11A, a lower surface 26*b* disposed on an opposite side to the upper surface 26*a*, a first region 26A in which a plurality of first through-holes 28A are formed, and a second region 26B in which a plurality of second through-holes 28B are formed.

The first and second regions 26A and 26B are regions having a semi-circular shape in a plan view, and are disposed outer side the region where the planar member 15 is disposed. The first region 26A faces the second region 26B in the X direction.

A plurality of first through-holes 28A are formed through the support plate main body 26 corresponding to the first region 26A in the Z direction. The one end portions 14A of the heat transfer tubes 14 are inserted into the plurality of first through-holes 28A, respectively.

The plurality of second through-holes 28B are formed through the support plate main body 26 corresponding to the second region 26B in the Z direction. The other end portions 14B of the heat transfer tubes 14 are each inserted into the plurality of second through-holes 28B.

The plurality of heat transfer tubes 14 are disposed in the space 11AB. The plurality of heat transfer tubes 14 have an inverted U-shape and are formed so that sizes of the inner diameter and the outer diameter are equal to each other.

Each of the one end portions 14A of the plurality of heat transfer tubes 14 is inserted into each one of the plurality of first through-holes 28A.

Each of the other end portions 148 of the plurality of heat transfer tubes 14 is inserted into each one of the second through-holes 28B. Thus, the plurality of heat transfer tubes 14 are supported by the tube support plate 13.

Depending on the positions of the first and second through-holes 28A and 28B into which the plurality of heat transfer tubes 14 are inserted, the distance and height of one end portion 14A and another end portion 14B in the X direction of the plurality of heat transfer tubes 14 differ.

When the compressed gas Gp is introduced into the space 11AB, the outer peripheral surfaces of the plurality of heat transfer tubes 14 come into contact with the compressed gas Gp.

The planar member 15 is provided between the lower surface 26*b* of the support plate main body 26 and the bottom surface in the casing main body 11A so as to divide the space formed between the support plate main body 26 and the bottom surface in the casing main body 11A into two sections.

The planar member 15 is a member for separating the cooling water supply chamber 16 that exposes the plurality of first through-holes 28A and the cooling water collection chamber 17 that exposes the plurality of second through-holes 28B.

The cooling water supply chamber 16 is partitioned by the bottom surface in the casing main body 11A, the tube support plate 13, and the planar member 15.

The cooling water supply chamber 16 is in communication with the plurality of first through-holes 28A. The cooling water supply chamber 16 is filled with the cooling water Wc supplied into the one end portions 14A of the plurality of heat transfer tubes 14 via the plurality of first through-holes 28A.

The cooling water Wc inside the cooling water supply chamber 16 is the cooling water Wc before heat exchange with the compressed gas Gp introduced into the space 11AB, and thus has a low temperature.

The cooling water collection chamber 17 is partitioned by the bottom surface in the casing main body 11A, the tube support plate 13, and the planar member 15.

The cooling water collection chamber 17 is in communication with the plurality of second through-holes 28B. In the cooling water collection chamber 17, the cooling water Wc having an increased temperature is introduced by heat exchange with the compressed gas Gp via the plurality of second through-holes 28B.

The cooling water introduction port 22 is provided in a portion of the outer side of the bottom portion of the casing main body 11A that faces the cooling water supply chamber 16. The cooling water introduction port 22 protrudes in a direction spaced apart from the casing main body 11A. The flow path in the cooling water introduction port 22 is in communication with the cooling water supply chamber 16.

The cooling water introduction port 22 introduces the cooling water into the cooling water supply chamber 16. Due to the pressure generated when introducing the cooling water, the cooling water is introduced into the one end portions 14A of the plurality of heat transfer tubes 14 via the cooling water supply chamber 16.

In general, the pressure of the cooling water Wc introduced into the one end portion 14A of the heat transfer tube 14 tends to decrease from the central portion toward the outer peripheral portion of the tube support plate 13.

The cooling water lead-out port 24 is provided in a portion of the outer side of the bottom portion of the casing main body 11A that faces the cooling water collection chamber 17. The cooling water lead-out port 24 protrudes in a direction spaced apart from the casing main body 11A.

The flow path in the cooling water lead-out port 24 is in communication with the cooling water collection chamber 17. The cooling water lead-out port 24 contributes to heat exchange from the cooling water collection chamber 17, and draws out the cooling water Wc having an increased temperature to the outside of the casing 11.

The flow path resistor 25 of the first embodiment will be described below with reference to FIGS. 1 to 10. Here, an example will be given of a case in which the flow path resistor 25 is disposed only within the one end portions 14A of the plurality of heat transfer tubes 14 inserted into the first through-holes 28A formed in the outer peripheral portion of the tube support plate 13, among all the heat transfer tubes 14 mounted on the tube support plate 13. In FIG. 1 to FIG. 10, the same reference signs are assigned to the same constituent components.

The flow path resistor 25 includes an outer frame member 31, dividing plates 32A to 32D (a plurality of dividing plates), ribs 33A to 33E, resistance-imparting portions 34A to 34E (a plurality of resistance-imparting portions), and a protruding portion 35.

The outer frame member 31 is a member extending in the Z direction. The outer frame member 31 includes an outer frame member main body 36, a fluid introduction port 38, a fluid lead-out port 39, and a hollow portion 31A.

The outer frame member main body 36 includes a cylinder portion 43 having a cylindrical shape, a circular first plate portion 45 disposed at one end of the cylinder portion 43, and a circular second plate portion 46 disposed at the other end of the cylinder portion 43.

An outer surface 31*a* of the outer frame member 31 is constituted by an outer peripheral surface 43*a* of the cylinder portion 43, an outer surface 45*a* of the first plate portion 45, and an outer surface 46*a* of the second plate portion 46.

The fluid introduction port 38 is formed on one side of the first plate portion 45 in the X direction so as to penetrate through the first plate portion 45. The fluid introduction port 38 is an introduction port for introducing the cooling water Wc into the outer frame member 31.

The fluid introduction port 38 is sized (opening area) to function as a contraction flow portion of the resistance-imparting portion 34A disposed at one end portion of the outer frame member 31 of the plurality of resistance-imparting portions 34A to 34E.

The opening area of the fluid introduction port 38 can be set to be 50% or less of the opening area of the inside of the heat transfer tube 14, for example.

The fluid lead-out port 39 is formed on the other side of the second plate portion 46 in the X direction so as to penetrate through the second plate portion 46. The fluid lead-out port 39 passes through the plurality of resistance-imparting portions 34A to 34E so as to draw out the resistance-added cooling water Wc into the heat transfer tube 14 positioned above the flow path resistor 25.

The fluid lead-out port 39 is sized (opening area) to function as a contraction flow portion (first contraction flow portion) of the resistance-imparting portion 34E disposed at the other end portion of the outer frame member 31 of the plurality of resistance-imparting portions 34A to 34E.

The opening area of the fluid lead-out port 39 can be set, for example, to be 50% or less of the opening area of the inside of the heat transfer tube 14, for example.

The hollow portion 31A is a cylindrical space partitioned by an inner peripheral surface of the cylinder portion 43, an inner surface 45*b* of the first plate portion 45, and an inner surface 46*b* of the second plate portion 46. The hollow portion 31A communicates the fluid introduction port 38 and the fluid lead-out port 39.

The dividing plate 32A is a plate member having a circular shape, and includes a planar surface 32Aa, a surface 32Ab that is a planar surface disposed on an opposite side of the surface 32Aa, and a first contraction flow portion 32AH.

The dividing plate 32A is provided on an inner peripheral surface of the outer frame member 31 so that an enlarged diameter portion 51 is partitioned between the surface 32Aa and the inner surface 45*b* of the first plate portion 45. The enlarged diameter portion 51 is a space disposed in the hollow portion 31A and serving as a flow path for the cooling water Wc. The enlarged diameter portion 51 is in communication with the fluid introduction port 38.

The first contraction flow portion 32AH is formed so as to penetrate through the dividing plate 32A. The first contraction flow portion 32AH communicates with the enlarged diameter portion 51 and also communicates with the fluid introduction port 38 via the enlarged diameter portion 51. When the cooling water Wc of the enlarged diameter portion 51 passes through the first contraction flow portion 32AH, the first contraction flow portion 32AH adds resistance to the cooling water Wc.

The opening area of the first contraction flow portion 32AH can be set to be 50% or less of the opening area of the inside of the heat transfer tube 14, for example.

The first contraction flow portion 32AH is disposed on the other side of the dividing plate 32A in the X direction. As a result, in the Z direction, the first contraction flow portion 32AH is formed at a position different from the fluid introduction port 38 that functions as the contraction flow portion.

In this manner, the forming position of the first contraction flow portion 32AH and the forming position of the fluid introduction port 38 are varied in the Z direction, and thus the flow path of the cooling water Wc from the fluid introduction port 38 toward the first contraction flow portion 32AH can be lengthened without lengthening the length of the flow path resistor 25, so as to add resistance to the cooling water Wc.

The dividing plate 32B is a plate member having a circular shape, and includes a planar surface 32Ba, a surface 32Bb that is a planar surface disposed on an opposite side of the surface 32Ba, and a first contraction flow portion 32GH.

The dividing plate 32B is provided on the inner peripheral surface of the outer frame member 31 positioned above the dividing plate 32A so that the enlarged diameter portion 52 is partitioned between the surface 32Ba and the surface 32Ab of the dividing plate 32A. The enlarged diameter portion 52 is a space disposed in the hollow portion 31A and serving as a flow path for the cooling water Wc.

The enlarged diameter portion 52 is in communication with the first contraction flow portion 32AH. The cooling water Wc that has passed through the first contraction flow portion 32AH is introduced into the enlarged diameter portion 52.

The first contraction flow portion 32BH is formed so as to penetrate through the dividing plate 32B positioned on the one side in the X direction. The first contraction flow portion 32BH is in communication with the enlarged diameter portion 52. In the Z direction, the first contraction flow portion 32BH is formed at a position different from the first contraction flow portion 32AH.

When the cooling water Wc of the enlarged diameter portion 52 passes through the first contraction flow portion 32BH, the first contraction flow portion 32BH adds resistance to the cooling water Wc. The opening area of the first contraction flow portion 32BH can be set to be 50% or less of the opening area of the inside of the heat transfer tube 14, for example.

The dividing plate 32C is a plate member having a circular shape, and includes a planar surface 32Ca, a surface 32Cb that is a planar surface disposed on the opposite side of the surface 32Ca, and a first contraction flow portion 32CH.

The dividing plate 32C is provided on the inner peripheral surface of the outer frame member 31 positioned above the dividing plate 32B so that the enlarged diameter portion 53 is partitioned between the surface 32Ca and the surface 32Bb of the dividing plate 32B. The enlarged diameter portion 53 is a space disposed in the hollow portion 31A and serving as a flow path for the cooling water Wc.

The enlarged diameter portion 53 is in communication with the first contraction flow portion 32BH. The cooling water Wc that has passed through the first contraction flow portion 32BH is introduced into the enlarged diameter portion 53.

The first contraction flow portion 32CH is formed so as to penetrate through the dividing plate 32C positioned on the other side in the X direction. The first contraction flow portion 32CH is in communication with the enlarged diameter portion 53. In the Z direction, the first contraction flow portion 32CH is formed at a position different from the first contraction flow portion 32BH.

When the cooling water Wc of the enlarged diameter portion 53 passes through the first contraction flow portion 32CH, the first contraction flow portion 32CH adds resistance to the cooling water Wc. The opening area of the first contraction flow portion 32CH can be set to be 50% or less of the opening area of the inside of the heat transfer tube 14, for example.

The dividing plate 32D is a plate member having a circular shape, and includes a planar surface 32Da, a surface 32Db that is a planar surface disposed on an opposite side of the surface 32Da, and a first contraction flow portion 32DH.

The dividing plate 32D is provided on the inner peripheral surface of the outer frame member 31 positioned above the dividing plate 32C so as to define the enlarged diameter portion 54 between the surface 32Cb and the surface 32Da of the dividing plate 32C and define the enlarged diameter portion 55 between the inner surface 46*b* of the second plate portion 46 and the surface 32Db.

The enlarged diameter portions 54 and 55 are each a space disposed in the hollow portion 31A and serving as a flow path for the cooling water Wc. The enlarged diameter portion 54 is in communication with the first contraction flow portion 32CH. The cooling water Wc that has passed through the first contraction flow portion 32CH is introduced into the enlarged diameter portion 54.

The enlarged diameter portion 55 is in communication with the fluid lead-out port 39. The cooling water Wc that has passed through the enlarged diameter portion 55 is drawn out into the heat transfer tube 14 via the fluid lead-out port 39.

The rib 33A is provided on the surface 32Aa so as to divide the surface 32Aa of the dividing plate 32A into two sections in the X direction. The rib 33A extends in the Y direction and protrudes below (in the Z direction) the surface 32Aa of the dividing plate 32A. As a result, the height of the central portion of the enlarged diameter portion 51 is decreased by the rib 33A.

By providing the rib 33A formed as described above, the cooling water Wc flowing through the enlarged diameter portion 51 can collide with the rib 33A, and a portion of the enlarged diameter portion 51 through which the cooling water Wc flows can be narrowed. As a result, it is possible to further acid resistance to the cooling water Wc flowing through the enlarged diameter portion 51 without increasing the length of the flow path resistor 25.

The rib 33B is provided on the surface 32Ba so as to divide the surface 32Ba of the dividing plate 32B into two sections in the X direction. The rib 33B extends in the Y direction and protrudes below (in the Z direction) the surface 32Ba of the dividing plate 32B.

The rib 33C is provided on the surface 32Ca so as to divide the surface 32Ca of the dividing plate 32C into two sections in the X direction. The rib 33C extends in the Y direction and protrudes below (in the Z direction) the surface 32Ca of the dividing plate 32C.

The rib 33D is provided on the surface 32Da so as to divide the surface 32Da of the dividing plate 32D into two sections in the X direction. The rib 33D extends in the Y direction and protrudes below (in the Z direction) the surface 32Da of the dividing plate 32D.

The rib 33E is provided on the inner surface 46*b* so as to divide the inner surface 46*b* of the second plate portion 46 into two sections in the X direction. The rib 33E extends in the Y direction and protrudes below (in the Z direction) the inner surface 46*b* of the second plate portion 46.

The ribs 33B to 33D formed in this manner can achieve similar effects to those of the rib 33A described above.

The resistance-imparting portions 34A to 34E are disposed on the inner side of the outer surface 31*a* of the outer frame member 31. The resistance-imparting portions 34A to 34E are layered in the Z direction in the order of the resistance-imparting portion 34A, the resistance-imparting portion 34B, the resistance-imparting portion 34C, the resistance-imparting portion 34D, and the resistance-imparting portion 34E.

The resistance-imparting portion 34A includes the fluid introduction port 38, the first contraction flow portion 32AH, the enlarged diameter portion 51, and the rib 33A. The resistance-imparting portion 34A adds resistance to the cooling water Wc when the cooling water Wc passes through the fluid introduction port 38 and the first contraction flow portion 32AH.

The resistance-imparting portion 34B is disposed between the resistance-imparting portion 34A and the resistance-imparting portion 34C. The resistance-imparting portion 34B includes the first contraction flow portion 32BH, the enlarged diameter portion 52 that communicates with the first contraction flow portion 32AH, and the rib 33B.

The resistance-imparting portion 34B having the above-described configuration further adds resistance to the cooling water Wc added with resistance by the resistance-imparting portion 34A.

The resistance-imparting portion 34C is disposed between the resistance-imparting portion 34B and the resistance-imparting portion 34D. The resistance-imparting portion 34C includes the first contraction flow portion 32CH, the enlarged diameter portion 53 that communicates with the first contraction flow portion 32BH, and the rib 33C.

The resistance-imparting portion 34C having the above-described configuration further acids resistance to the cooling water Wc added with resistance by the resistance-imparting portion 34B.

The resistance-imparting portion 34D is disposed between the resistance-imparting portion 34C and the resistance-imparting portion 34E. The resistance-imparting portion 34D includes the first contraction flow portion 32DH, the enlarged diameter portion 54 that communicates with the first contraction flow portion 32CH, and the rib 33D.

The resistance-imparting portion 34D having the above-described configuration further adds resistance to the cooling water Wc added with resistance by the resistance-imparting portion 34C.

The resistance-imparting portion 34E is disposed on the resistance-imparting portion 34D. The resistance-imparting portion 34E includes the fluid lead-out port 39 that functions as the first contraction flow portion, the enlarged diameter portion 55 that communicates with the first contraction flow portion 32DH, and the rib 33E.

The resistance-imparting portion 34E having the above-described configuration further adds resistance to the cooling water Wc added with resistance by the resistance-imparting portion 34D. Then, the sufficiently resistance-added cooling water Wc (cooling water Wc having a high pressure) is drawn out into the heat transfer tube 14 via the fluid lead-out port 39.

The protruding portion 35 is provided on the outer peripheral surface 43*a* (outer peripheral surface of the outer frame member 31) positioned on the one end side of the cylinder portion 43. The protruding portion 35 is a ring-shaped member protruding from the outer peripheral surface 43*a* to the outer side of the outer frame member 31.

In a state in which the flow path resistor 25 is disposed inside the one end portion 14A of the heat transfer tube 14 (the state illustrated in FIG. 3), the protruding portion 35 is disposed outer side the heat transfer tube 14. In this state, the protruding portion 35 is in contact with the lower surface 26*b* of the support plate main body 26.

Having the protruding portion 35 formed in this manner allows the protruding portion 35 to function as a stopper that regulates the position of the flow path resistor 25 with respect to the one end portion 14A when the flow path resistor 25 is mounted inside the one end portion 14A (end portion of the tubular member) of the heat transfer tube 14.

In addition, in a state in which the flow path resistor 25 is disposed inside the one end portion 14A of the heat transfer tube 14, the protruding portion 35 can be disposed on the outer side of the heat transfer tubes 14, so that the flow path resistor 25 can be easily attached to and detached from the heat transfer tube 14.

In the flow path resistor 25 of the first embodiment, the resistance-imparting portions 34A to 34E disposed in the Z direction are provided, and the first contraction flow portion forming one of the resistance-imparting portions 34A to 34E adjacent to each other (one of the first contraction flow portions 32AH to 32DH) is communicated with the enlarged diameter portion forming the other resistance-imparting portion (one of the enlarged diameter portions 51 to 55), thereby making it possible to add a repeating resistance to the cooling water Wc. As a result, the cooling water Wc having a high pressure can be drawn out from the fluid lead-out port 39, and thus, backflow of the cooling water Wc can be suppressed.

In addition, the first contraction flow portions 32AH to 32DH provided in the resistance-imparting portions adjacent to each other are disposed at different positions in the Z direction, thereby making it possible to form the flow path of the cooling water Wc formed in the outer frame member 31 in a winding shape.

As a result, the flow path of the cooling water Wc can be increased, and the cooling water Wc can collide with the inner surface of the outer frame member 31 to further add resistance to the cooling water Wc.

Therefore, even if the length of the flow path resistor 25 (the length of the outer frame member 31) is decreased, it is possible to add a large resistance to the cooling water Wc. Therefore, backflow of the cooling water Wc can be suppressed in a small occupancy area.

Note that the flow path resistor 25 can be manufactured using, for example, a 3D printer. In this manner, the 3D printer can be used to easily manufacture the flow path resistor 25 having a complex shape.

According to the heat exchanger 10 provided with the flow path resistor 25 formed as described above, the cooling water Wc to which resistance is added can be supplied into the heat transfer tubes 14. In other words, the cooling water Wc having a high pressure can be supplied into the heat transfer tubes 14. As a result, evaporation of the cooling water Wc caused by heat exchange can be suppressed in the heat transfer tubes 14, and thus, backflow of the cooling water Wc inside the heat transfer tubes 14 can be suppressed.

In addition, by disposing the flow path resistor 25 in the one end portions 14A of the heat transfer tubes 14, it is not necessary to separately secure the region where the flow path resistor 25 is provided, thereby making it possible to reduce the area occupied by the flow path resistor 25.

In the first embodiment, an example has been given of the case of providing the ribs 33A to 33E that divide the area of the surfaces 32Aa to 32Da and 46*b* into two sections. Alternatively, for example, a plurality of ribs disposed at intervals in the Y direction may be provided, or ribs may be provided on a portion of the surfaces 32Aa to 32Da and 46*b* in the Y direction. Also, when the ribs are provided, similar effects to those of the ribs 33A to 33E can be obtained.

In addition, in the first embodiment, the ribs 33A to 33E extending downward have been given as examples, but ribs extending upward may be separately provided so as to face the ribs 33A to 33E in the Z direction.

Furthermore, in the first embodiment, the Z direction (the direction orthogonal to the dividing plate 32A to 32D) has been given as an example of the direction in which the ribs 33A to 33E protrude, but the direction in which the ribs 33A to 33E protrude is not limited to the Z direction. The direction in which the ribs 33A to 33E protrude may be a direction that intersects with the dividing plates 32A to 32D.

In addition, in the first embodiment, an example has been given of the case of providing the flow path resistor 25 in which the same number of the resistance-imparting portions 34A to 34E are layered only in the one end portions 14A of the plurality of heat transfer tubes 14 inserted into the first through-holes 28A formed in the outer peripheral portion of the tube support plate 13, among all the heat transfer tubes 14 mounted on the tube support plate 13. However, depending on the pressure of the cooling water Wc supplied into each of the heat transfer tubes 14, the respective heat transfer tubes 14 may be provided with flow path resistors with different number of the layered resistance-imparting portions.

In this manner, the number of the resistance-imparting portions forming the flow path resistors is varied depending on the pressure of the cooling water Wc introduced into the one end portions 14A of the heat transfer tubes 14, so that variations in difference in pressure of the cooling water Wc flowing in the respective heat transfer tubes 14 can be reduced.

Figure 4:
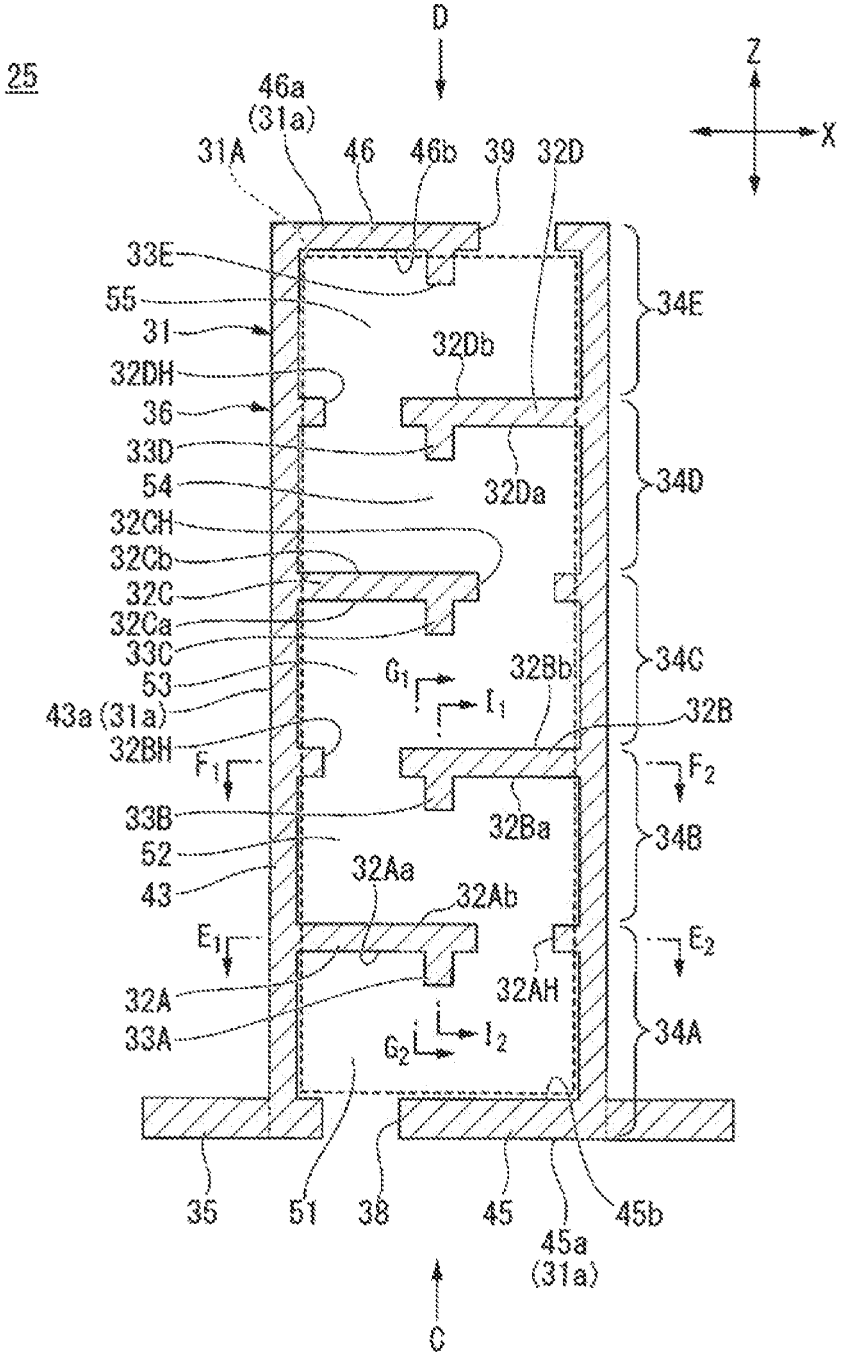
FIG. 4 is a cross-sectional view of the flow path resistor illustrated in FIG. 3.
Figure 5:
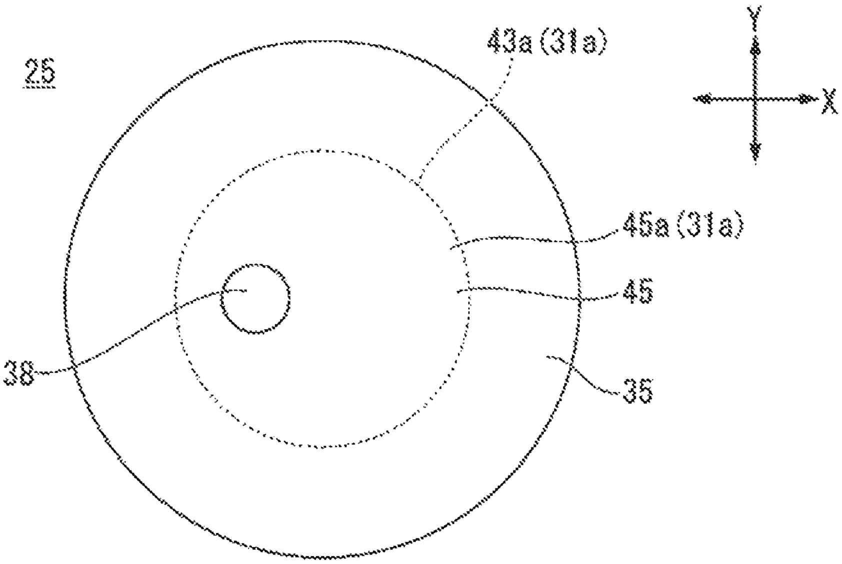
FIG. 5 is a plan view of the flow path resistor illustrated in FIG. 4 as viewed in C.
Figure 6:
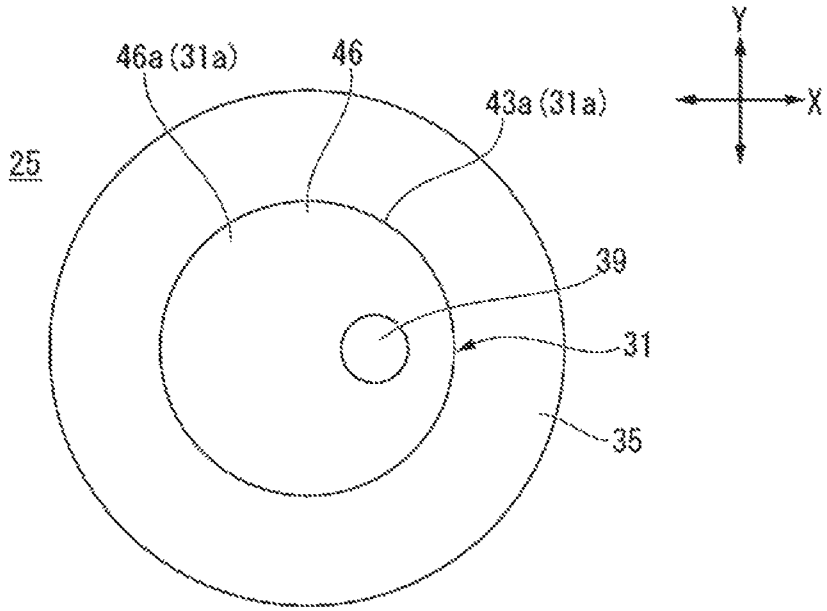
FIG. 6 is a plan view of the flow path resistor illustrated in FIG. 4 as viewed in D.
Figure 7:
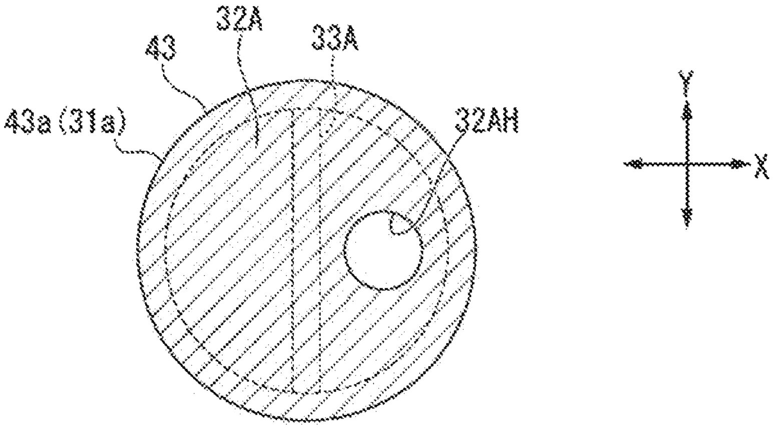
FIG. 7 is a cross-sectional view of the flow path resistor illustrated in FIG. 4 in the $E_1$-$E_2$ line direction.
Figure 8:
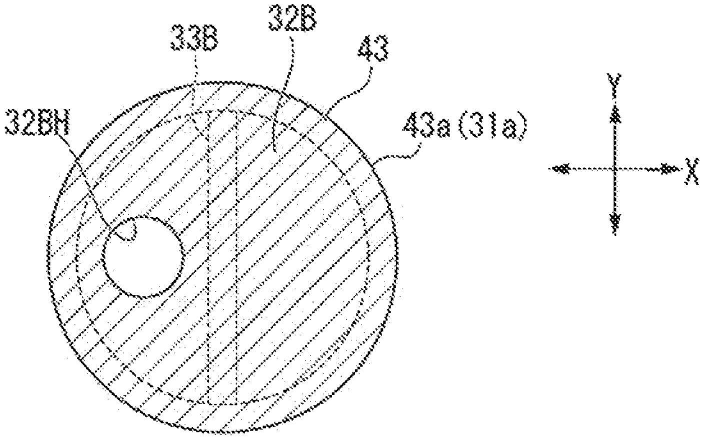
FIG. 8 is a cross-sectional view of the flow path resistor illustrated in FIG. 4 in the $F_1$-$F_2$ line direction.
Figure 9:
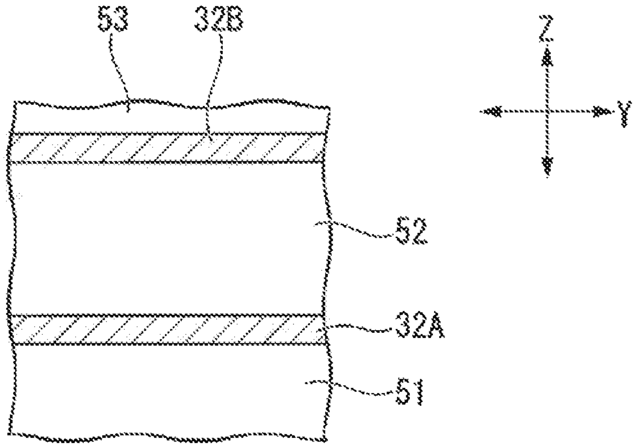
FIG. 9 is a cross-sectional view of the flow path resistor illustrated in FIG. 4 in the $G_1$-$G_2$ line direction.
Figure 10:
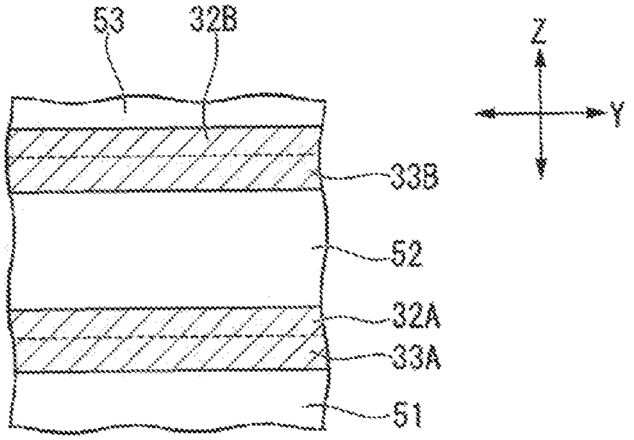
FIG. 10 is a cross-sectional view of the flow path resistor illustrated in FIG. 4 in the $H_1$-$H_2$ line direction.

Here, a flow path resistor 60 according to a modified example of the first embodiment will be described with reference to FIG. 11. in FIG. 11, the same reference signs are assigned to the same components as the structural bodies illustrated in FIG. 4.

Figure 11:
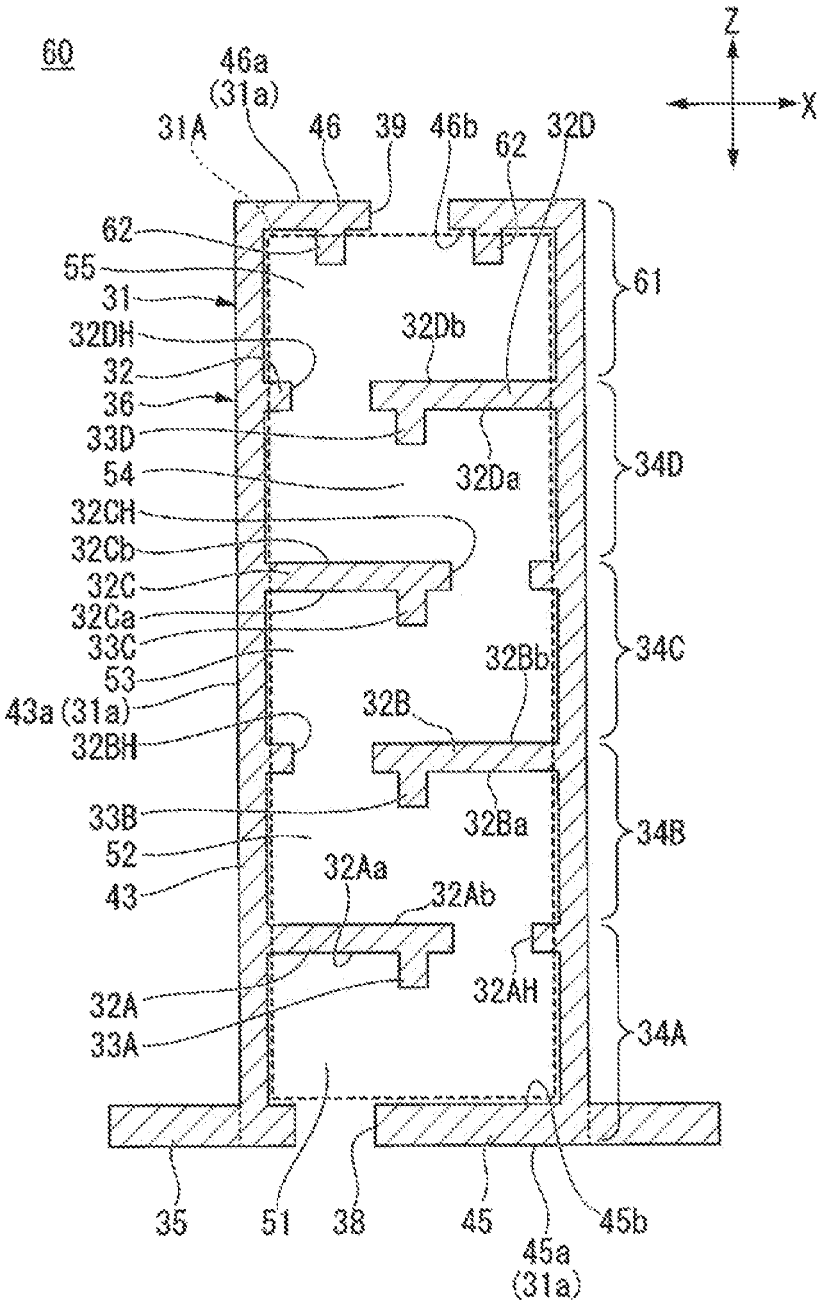
FIG. 11 is a vertical cross-sectional view of a flow path resistor according to a modified example of the first embodiment of the present invention.

With reference to FIG. 11, the flow path resistor 60 is formed in the same manner as the flow path resistor 25, except that the position where the fluid lead-out port 39 forming the flow path resistor 25 of the first embodiment is formed is varied, and that a resistance-imparting portion 61 is provided instead of the resistance-imparting portion 34E.

The fluid lead-out port 39 that constitutes the flow path resistor 60 is formed so as to penetrate through a central portion of the second plate portion 46.

The resistance-imparting portion 61 is formed in the same manner as the resistance-imparting portion 34E except that a rib 62 is provided instead of the rib 33E. The rib 62 is provided on the inner surface 46*b* of the second plate portion 46 so as to surround the fluid lead-out port 39. The rib 62 protrudes in a direction toward the surface 32Db of the dividing plate 32D.

The flow path resistor 60 according to the modified example of the first embodiment has the fluid lead-out port 39 passing through the central portion of the second plate portion 46 and thus can suppress collision of the cooling water on the cylinder portion 43. As a result, erosion can be suppressed.

By having the fluid lead-out port 39 penetrating the central portion of the second plate portion 46, the direction of movement of the cooling water drawn out from the fluid lead-out port 39 can be made the same as the Z direction, that is the direction in which the outer frame member 31 extends.

Figure 3:
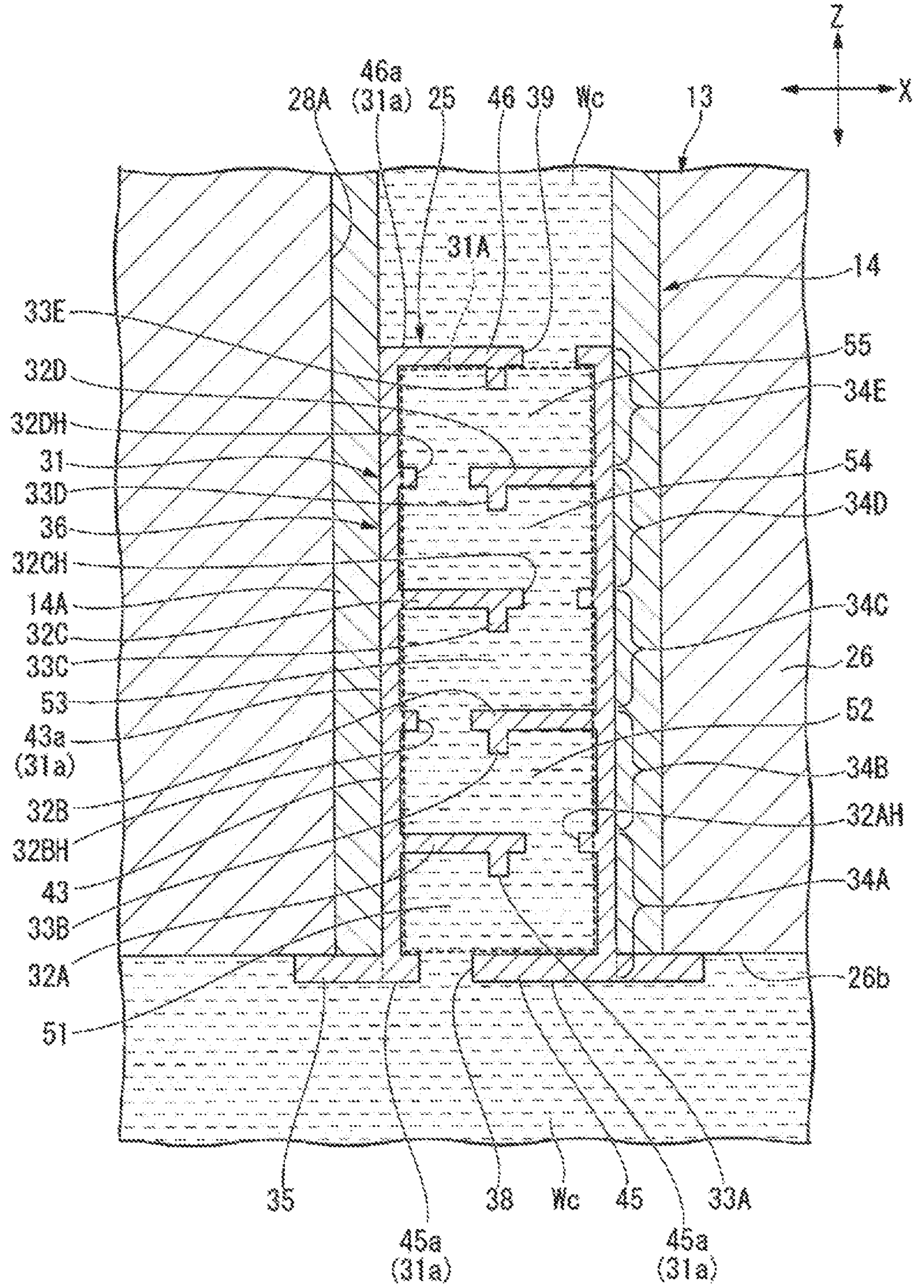
FIG. 3 is a cross-sectional view of a portion surrounded by a region A of the heat exchanger illustrated in FIG. 1.

As a result, when the flow path resistor 60 is mounted inside the one end portion 14A of the heat transfer tube 14 illustrated in FIG. 3, the collision of the cooling water Wc drawn out from the fluid lead-out port 39 on the inner peripheral surface of the heat transfer tube 14 can be suppressed.

In addition, by having the rib 62 provided on the inner surface 46*b* of the second plate portion 46 so as to surround the fluid lead-out port 39, the cooling water can collide with the ribs 62 to add resistance to the cooling water before reaching the fluid lead-out port 39.

In the modified example of the first embodiment, an example has been given of the case in which one rib 62 having a ring shape is provided. However, instead of the rib 62, for example, two ribs extending in one direction may be provided, and the fluid lead-out port 39 may be disposed between the two ribs, for example. Also, when two ribs formed in this manner are provided, the cooling water can collide with the ribs to add resistance to the cooling water before reaching the fluid lead-out port 39.

Second Embodiment

Figure 12:
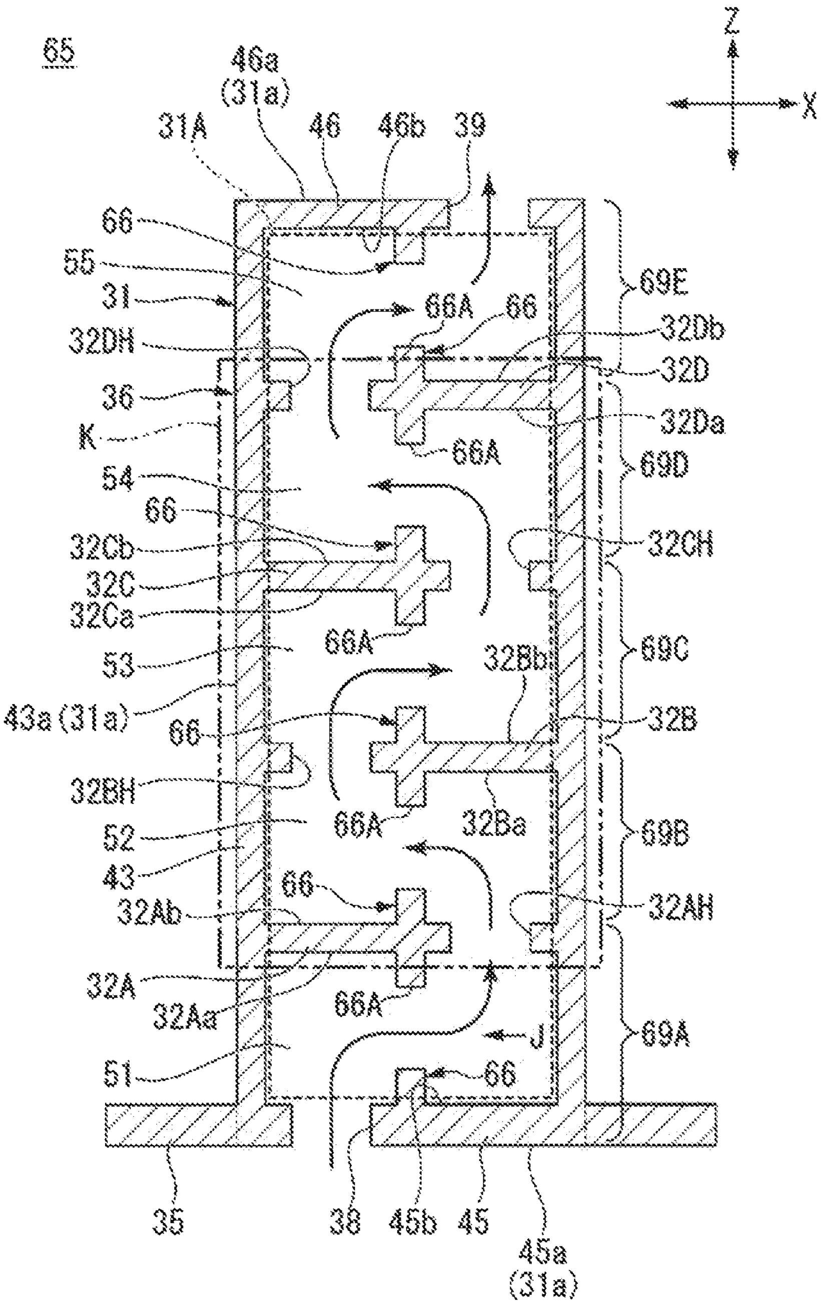
FIG. 12 is a vertical cross-sectional view of a flow path resistor according to a second embodiment of the present invention.
Figure 13:
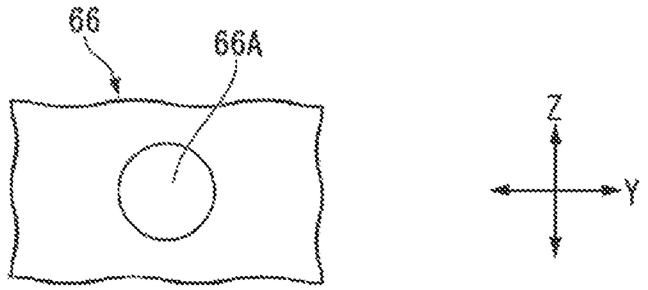
FIG. 13 is a view of the partitioning plate illustrated in FIG. 12 viewed in J.
Figure 14:
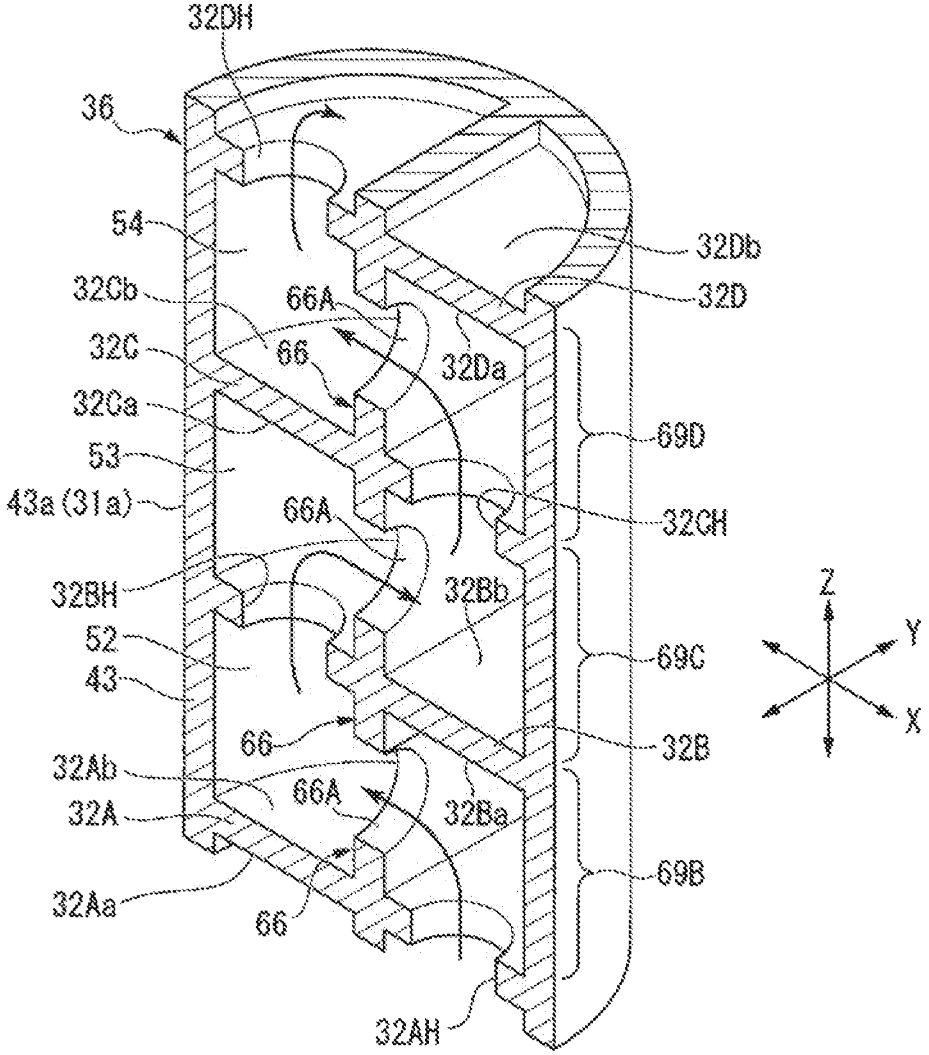
FIG. 14 is a perspective view of a portion surrounded by a region K of the flow path resistor illustrated in FIG. 12.
Figure 15:
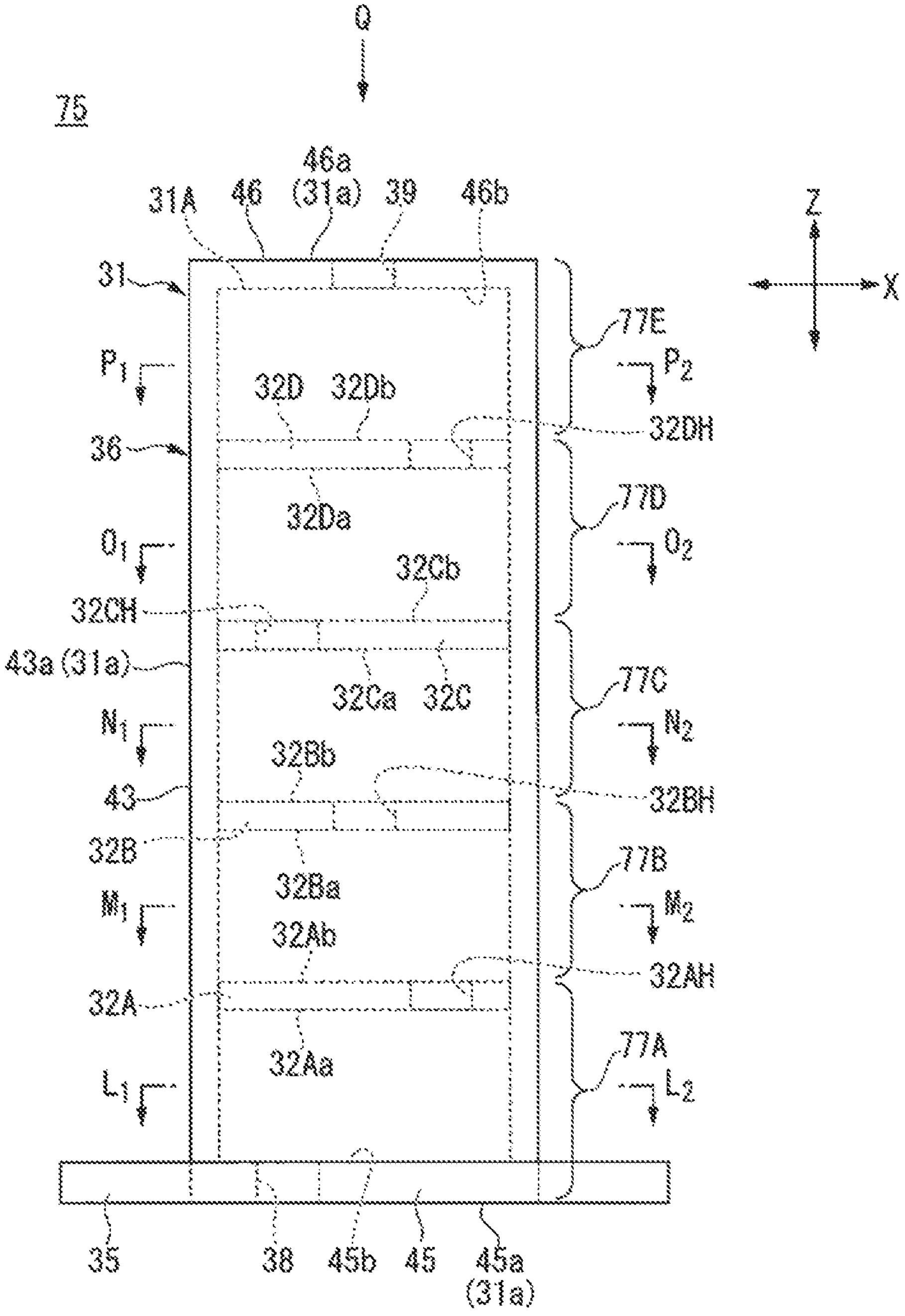
FIG. 15 is a side view of a flow path resistor according to a third embodiment of the present invention.
Figure 16:
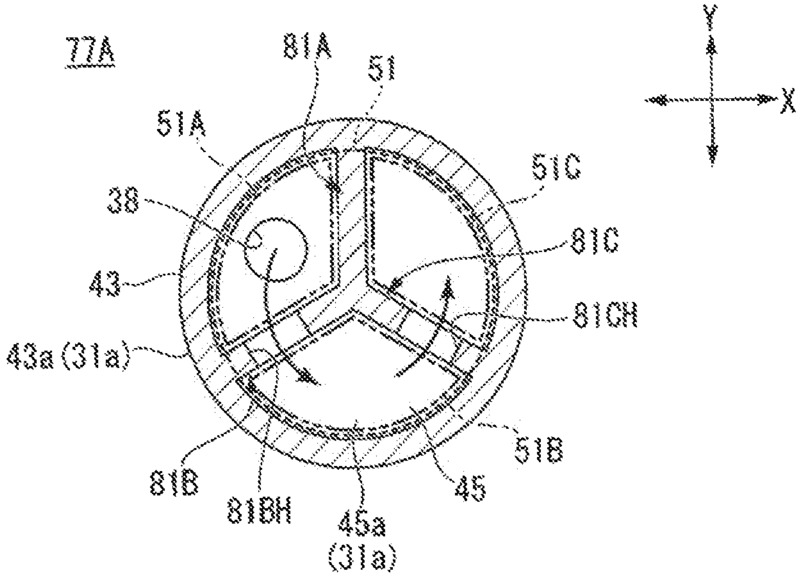
FIG. 16 is a cross-sectional view of the flow path resistor illustrated in FIG. 15 in the $L_1$-$L_2$ line direction.
Figure 17:
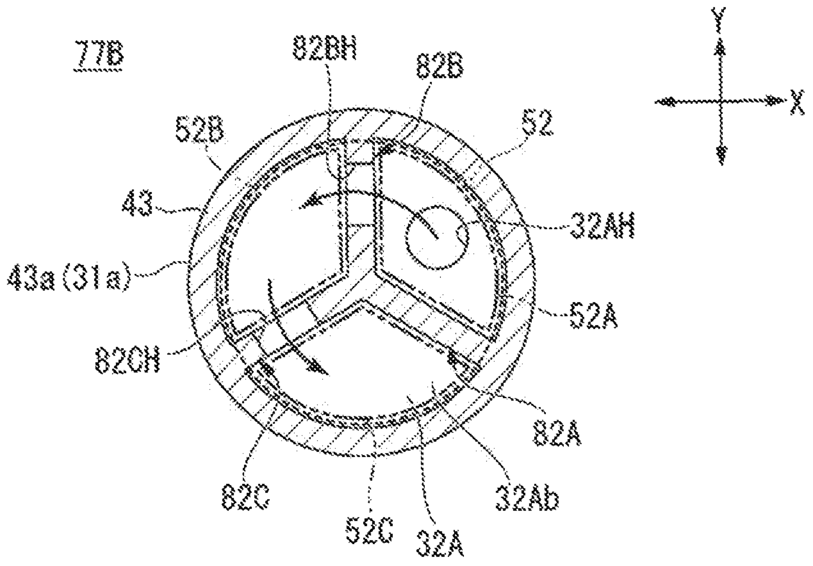
FIG. 17 is a cross-sectional view of the flow path resistor illustrated in FIG. 15 in the $M_1$-$M_2$ line direction.
Figure 18:
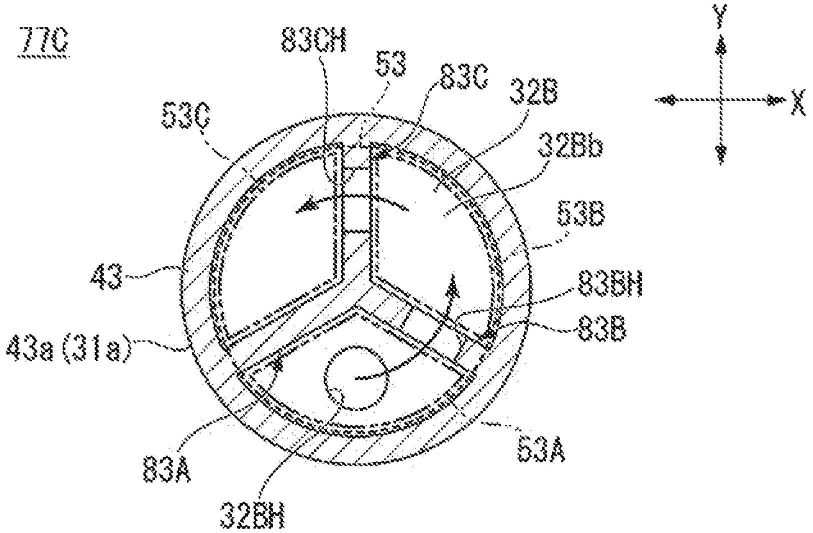
FIG. 18 is a cross-sectional view of the flow path resistor illustrated in FIG. 15 in the $N_1$-$N_2$ line direction.
Figure 19:
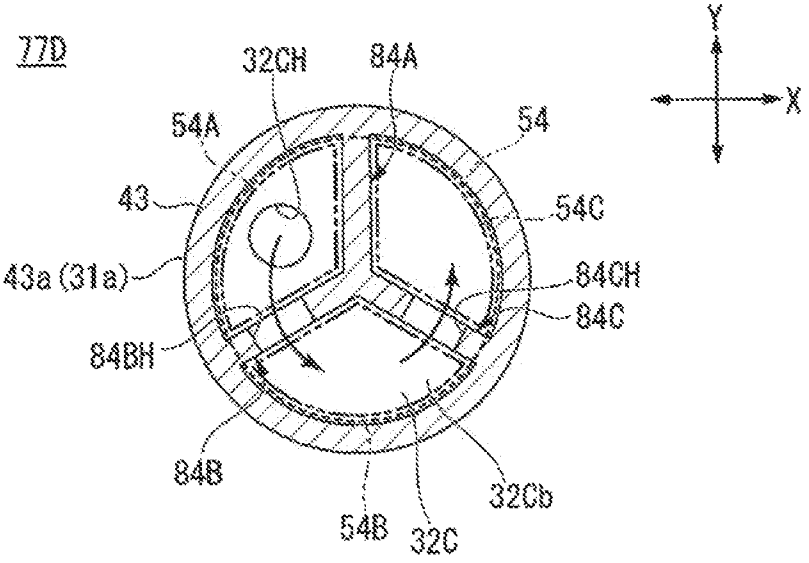
FIG. 19 is a cross-sectional view of the flow path resistor illustrated in FIG. 15 in the $O_1$-$O_2$ line direction.
Figure 20:
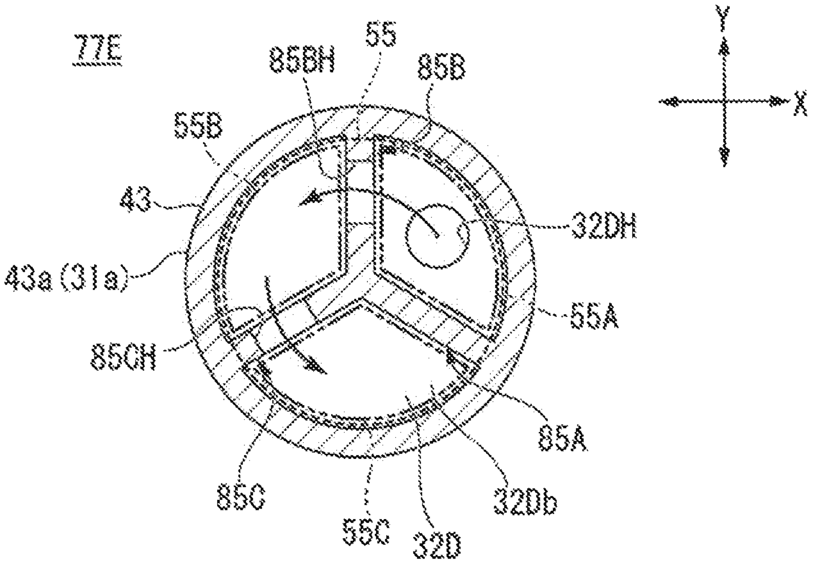
FIG. 20 is a cross-sectional view of the flow path resistor illustrated in FIG. 15 in the $P_1$-$P_2$ line direction.
Figure 21:
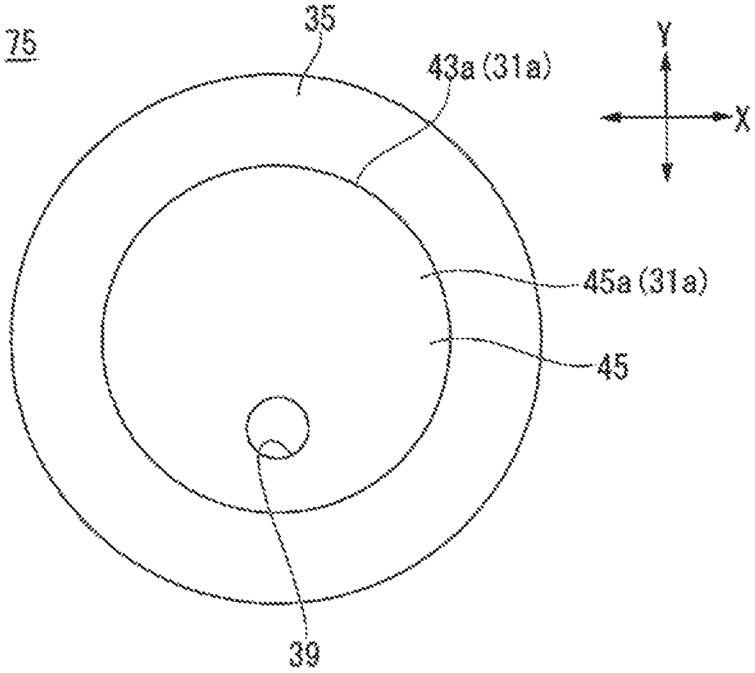
FIG. 21 is a plan view of the flow path resistor illustrated in FIG. 15 as viewed in Q.

A flow path resistor 65 according to a second embodiment of the present invention will be described with reference to FIGS. 12 to 14. In FIG. 12, the same reference signs are assigned to the same components as the structural bodies illustrated in FIG. 4. In FIG. 12 to FIG. 14, the same reference signs are assigned to the same constituent components. The arrows illustrated in FIGS. 12 and 14 indicate directions of movement of the cooling water.

The flow path resistor 65 is formed in the same manner as the flow path resistor 25, except that, instead of the ribs 33A to 33E and the resistance-imparting portions 34A to 34E that form the flow path resistor 25 of the first embodiment, the flow path resistor 65 includes a plurality of partitioning plates 66 where a second contraction flow portion 66A is formed, and resistance-imparting portions 69A to 69E.

Each of the plurality of partitioning plates 66 is provided between the first plate portion 45 and the dividing plate 32A, between the dividing plates 32A and 32B, between the dividing plates 32B and 32C, between the dividing plates 32C and 32D and between the dividing plate 32E and the second plate portion 46, so as to divide each of the enlarged diameter portions 51 to 55 into two.

The second contraction flow portion 66A is formed so as to penetrate a central portion of the partitioning plate 66. The inner diameter of the second contraction flow portion 66A can be set within the same range as the inner diameter of the first contraction flow portions 32AH to 32DH, for example.

The resistance-imparting portions 69A to 69E are disposed on the inner side of the outer surface 31*a* of the outer frame member 31. The resistance-imparting portion 69A to 69E are layered in the Z direction in the order of the resistance-imparting portion 69A, the resistance-imparting portion 69B, the resistance-imparting portion 69C, the resistance-imparting portion 69D, and the resistance-imparting portion 69E.

The resistance-imparting portion 69A is formed in the same manner as the resistance-imparting portion 34A except that the resistance-imparting portion 69A includes the partitioning plate 66 in which the second contraction flow portion 66A is formed, instead of the rib 33A forming the resistance-imparting portion 34A.

The resistance-imparting portion 69B is formed in the same manner as the resistance-imparting portion 34B except that the resistance-imparting portion 69B includes the partitioning plate 66 in which the second contraction flow portion 66A is formed, instead of the rib 33B forming the resistance-imparting portion 34B.

The resistance-imparting portion 69C is formed in the same manner as the resistance-imparting portion 34C except that the resistance-imparting portion 69C includes the partitioning plate 66 in which the second contraction flow portion 66A is formed, instead of the rib 33C forming the resistance-imparting portion 34C.

The resistance-imparting portion 69D is formed in the same manner as the resistance-imparting portion 34D except that the resistance-imparting portion 69D includes the partitioning plate 66 in which the second contraction flow portion 66A is formed, instead of the rib 33D forming the resistance-imparting portion 34D.

The resistance-imparting portion 69E is formed in the same manner as the resistance-imparting portion 34E except that the resistance-imparting portion 69E includes the partitioning plate 66 in which the second contraction flow portion 66A is formed, instead of the rib 33E forming the resistance-imparting portion 34E.

According to the flow path resistor 65 of the second embodiment, the plurality of partitioning plates 66 that divide the respective enlarged diameter portions 51 to 55 into two sections and that have the second contraction flow portion 66A, thereby making it possible to add resistance to the cooling water as it passes through the second contraction flow portion 66A.

As a result, the length of the flow path resistor 65 can be further decreased, so backflow of the cooling water can be suppressed in a smaller occupancy area.

Third Embodiment

A flow path resistor 75 according to a third embodiment of the present invention will be described with reference to FIGS. 15 to 21. In FIGS. 15 to 21, the same reference signs are assigned to the same components as the structural bodies illustrated in FIGS. 4 to 9. Further, in FIG. 15 to FIG. 21, the same reference signs are assigned to the same constituent components. Further, the arrows illustrated in FIGS. 16 to 20 indicate directions of movement of the cooling water.

The flow path resistor 75 is formed in the same manner as the flow path resistor 65, except that, instead of the plurality of partitioning plates 66 and the resistance-imparting portions 34A to 34E that form the flow path resistor 65 of the second embodiment, the flow path resistor 75 includes partitioning plates 81A to 81C, 82A to 82C, 83A to 83C, 84A to 84C, and 85A to 85C, and resistance-imparting portions 77A to 77E.

The partitioning plates 81A to 81C are provided between the first plate portion 45 and the dividing plate 32A so as to divide the enlarged diameter portion 51 into first to third portions 51A to 51C. The first portion 51A is partitioned by the partitioning plate 81A and the partitioning plate 81B.

The second portion 51B is partitioned by the partitioning plate 81B and the partitioning plate 81C. The third portion 51C is partitioned by the partitioning plate 81C and the partitioning plate 81A. The cooling water introduced from the fluid introduction port 38 flows into the first portion 51A.

The partitioning plate 81B has a second contraction flow portion 81BH formed in its central portion. The second contraction flow portion 81BH communicates the first portion 51A and the second portion 51B. The cooling water that has flowed into the first portion 51A flows into the second portion 51B via the second contraction flow portion 81BH.

The partitioning plate 81C has a second contraction flow portion 81CH formed in its central portion. The second contraction flow portion 81CH communicates the second portion 51B and the third portion 51C. The cooling water that has flowed into the second portion 51B flows into the third portion 51C.

The partitioning plate 81A does not have a contraction flow portion. Thus, the cooling water that has flowed into the third portion 51C does not flow into the first portion 51A.

The partitioning plates 82A to 82C are provided between the dividing plate 32A and the dividing plate 32B so as to divide the enlarged diameter portion 52 into first to third portions 52A to 52C.

The first portion 52A is partitioned by the partitioning plate 82A and the partitioning plate 82B, and is disposed above the third portion 51C.

The second portion 52B is partitioned by the partitioning plate 82B and the partitioning plate 82C, and is disposed above the first portion 51A.

The third portion 52C is partitioned by the partitioning plate 82C and the partitioning plate 82A, and is disposed above the second portion 51B. The cooling water that has passed through the third portion 51C flows into the first portion 52A.

The partitioning plate 82B has a second contraction flow portion 82BH formed in its central portion. The second contraction flow portion 82BH communicates the first portion 52A and the second portion 52B. The cooling water that has flowed into the first portion 52A flows into the second portion 52B via the second contraction flow portion 82BH.

The partitioning plate 82C has a second contraction flow portion 82CH formed in its central portion. The second contraction flow portion 82CH communicates the second portion 52B and the third portion 52C. The cooling water that has flowed into the second portion 52B flows into the third portion 52C via the second contraction flow portion 82CH.

The partitioning plate 82A does not have a contraction flow portion. Thus, the cooling water that has flowed into the third portion 52C does not flow into the first portion 52A.

The partitioning plates 83A to 83C are provided between the dividing plate 32B and the dividing plate 32C so as to divide the enlarged diameter portion 53 into first to third portions 53A to 53C.

The first portion 53A is partitioned by the partitioning plate 83A and the partitioning plate 83B, and is disposed above the third portion 52C.

The second portion 53B is partitioned by the partitioning plate 83B and the partitioning plate 83C, and is disposed above the first portion 52A.

The third portion 53C is partitioned by the partitioning plate 83C and the partitioning plate 83A, and is disposed above the second portion 52B. The cooling water that has passed through the third portion 51C flows into the first portion 53A.

The partitioning plate 83B has a second contraction flow portion 83BH formed in its central portion. The second contraction flow portion 83BH communicates the first portion 53A and the second portion 53B. The cooling water that has flowed into the first portion 53A flows into the second portion 53B via the second contraction flow portion 83BH.

The partitioning plate 83C has a second contraction flow portion 83CH formed in its central portion. The second contraction flow portion 83CH communicates the second portion 53B and the third portion 53C. The cooling water that has flowed into the second portion 53B flows into the third portion 53C via the second contraction flow portion 83CH.

The partitioning plate 83A does not have a contraction flow portion. Thus, the cooling water that has flowed into the third portion 53C does not flow into the first portion 53A.

The partitioning plates 84A to 84C are provided between the dividing plate 32B and the dividing plate 32C so as to divide the enlarged diameter portion 54 into first to third portions 54A to 54C.

The first portion 54A is partitioned by the partitioning plate 84A and the partitioning plate 84B, and is disposed above the third portion 53C.

The second portion 54B is partitioned by the partitioning plate 84B and the partitioning plate 84C, and is disposed above the first portion 53A.

The third portion 54C is partitioned by the partitioning plate 84C and the partitioning plate 84A, and is disposed above the second portion 53B. The cooling water that has passed through the third portion 52C flows into the first portion 54A.

The partitioning plate 84B has a second contraction flow portion 84BH formed in its central portion. The second contraction flow portion 84BH communicates the first portion 54A and the second portion 54B. The cooling water that has flowed into the first portion 54A flows into the second portion 54B via the second contraction flow portion 84BH.

The partitioning plate 84C has a second contraction flow portion 84CH formed in its central portion. The second contraction flow portion 84CH communicates the second portion 54B and the third portion 54C. The cooling water that has flowed into the second portion 54B flows into the third portion 54C via the second contraction flow portion 84CH.

The partitioning plate 84A does not have a contraction flow portion. Thus, the cooling water that has flowed into the third portion 54C does not flow into the first portion 54A.

The partitioning plates 85A to 85C are provided between the dividing plate 32B and the dividing plate 32C so as to divide the enlarged diameter portion 55 into first to third portions 55A to 55C.

The first portion 55A is partitioned by the partitioning plate 85A and the partitioning plate 85B, and is disposed above the third portion 54C.

The second portion 55B is partitioned by a partitioning plate 85B and a partitioning plate 85C, and is disposed above the first portion 54A.

The third portion 55C is partitioned by the partitioning plate 85C and the partitioning plate 85A, and is disposed above the second portion 54B.

The partitioning plate 85B has a second contraction flow portion 85BH formed in its central portion. The second contraction flow portion 85BH communicates the first portion 55A and the second portion 55B. The cooling water that has flowed into the first portion 55A flows into the second portion 55B via the second contraction flow portion 85BH.

The partitioning plate 85C has a second contraction flow portion 85CH formed in its central portion. The second contraction flow portion 85CH communicates the second portion 55B and the third portion 55C. The cooling water that has flowed into the second portion 55B flows into the third portion 55C via the second contraction flow portion 85CH. The cooling water that has passed through the third portion 53C is drawn out from the fluid lead-out port 39.

The partitioning plate 85A does not have a contraction flow portion. Thus, the cooling water that has flowed into the third portion 55C does not flow into the first portion 55A.

The resistance-imparting portions 77A to 77E are disposed on the inner side of the outer surface 31*a* of the outer frame member 31. The resistance-imparting portions 77A to 77E are layered in the Z direction in the order of the resistance-imparting portion 77A, the resistance-imparting portion 77B, the resistance-imparting portion 77C, the resistance-imparting portion 77D, and the resistance-imparting portion 77E.

The resistance-imparting portion 77A is formed in the same manner as the resistance-imparting portion 34A except that the resistance-imparting portion 77A includes the partitioning plates 81A to 81C instead of the rib 33A that forms the resistance-imparting portion 34A described in the first embodiment. The resistance-imparting portion 77A includes the enlarged diameter portion 51 divided into the first to third portions 51A to 51C, the fluid introduction port 38 that functions as a first contraction flow portion, the first contraction flow portion 32AH, and the second contraction flow portions 81BH and 81CH.

The resistance-imparting portion 77B is formed in the same manner as the resistance-imparting portion 34B except that the resistance-imparting portion 77B includes partitioning plates 82A to 82C instead of the rib 33B that forms the resistance-imparting portion 34B described in the first embodiment. The resistance-imparting portion 77B includes the enlarged diameter portion 52 divided into the first to third portions 52A to 52C, the first contraction flow portion 32BH, and the second contraction flow portions 82BH and 82CH.

The resistance-imparting portion 77C is formed in the same manner as the resistance-imparting portion 34C except that the resistance-imparting portion 77C includes the partitioning plates 83A to 83C instead of the rib 33C that forms the resistance-imparting portion 34C described in the first embodiment. The resistance-imparting portion 77C includes the enlarged diameter portion 53 divided into the first to third portions 53A to 53C, the first contraction flow portion 32CH, and the second contraction flow portions 83BH and 83CH.

The resistance-imparting portion 77D is formed in the same manner as the resistance-imparting portion 34D except that the resistance-imparting portion 77D includes partitioning plates 84A to 84C instead of the rib 33D forming the resistance-imparting portion 34D described in the first embodiment. The resistance-imparting portion 77D includes the enlarged diameter portion 54 divided into the first to third portions 54A to 54C, the first contraction flow portion 32DH, and the second contraction flow portions 84BH and 84CH.

The resistance-imparting portion 77E is formed in the same manner as the resistance-imparting portion 34E except that the resistance-imparting portion 77E includes partitioning plates 85A to 85C instead of the rib 33E forming the resistance-imparting portion 34E described in the first embodiment. The resistance-imparting portion 77E includes the enlarged diameter portion 55 divided into the first to third portions 55A to 55C, the fluid lead-out port 39 that functions as a first contraction flow portion, and the second contraction flow portions 85BH and 85CH.

The flow path resistor 75 of the third embodiment includes the partitioning plates 81A to 81C, 82A to 82C, 83A to 83C, 84A to 84C, and 85A to 85C that divide the respective enlarged diameter portions 51 to 55 into three sections, and thus the cooling water passes through the second contraction flow portions 81BH, 81CH, 82BH, 82CH, 82BH, 83CH, 84BH, 84CH, 85BH, and 85CH. As a result, it is possible to suppress backflow of the cooling water in a smaller occupancy area.

In the third embodiment, an example has been given of the case in which each of the enlarged diameter portions 51 to 55 is divided into three sections. However, a partitioning plate having a second contraction flow portion may be further provided to divide each of the enlarged diameter portions 51 to 55 into four or more sections.

Fourth Embodiment

Figure 22:
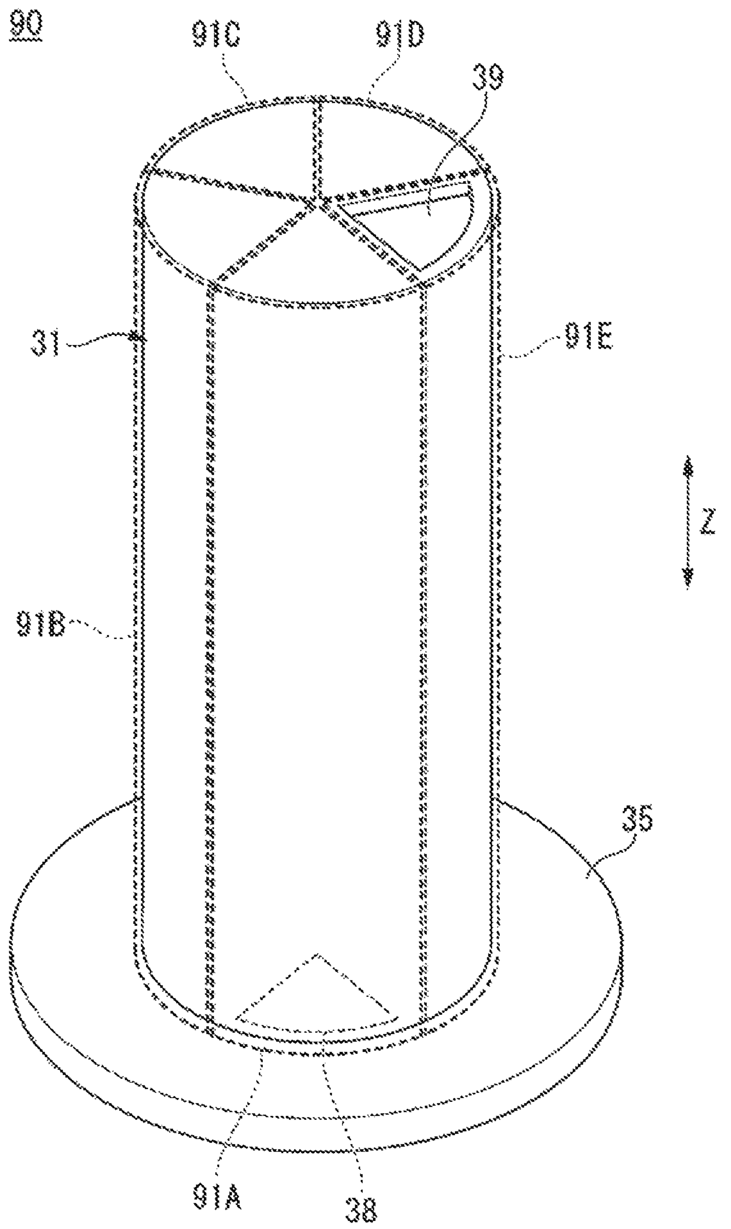
FIG. 22 is a perspective view of a flow path resistor according to a fourth embodiment of the present invention.
Figure 23:
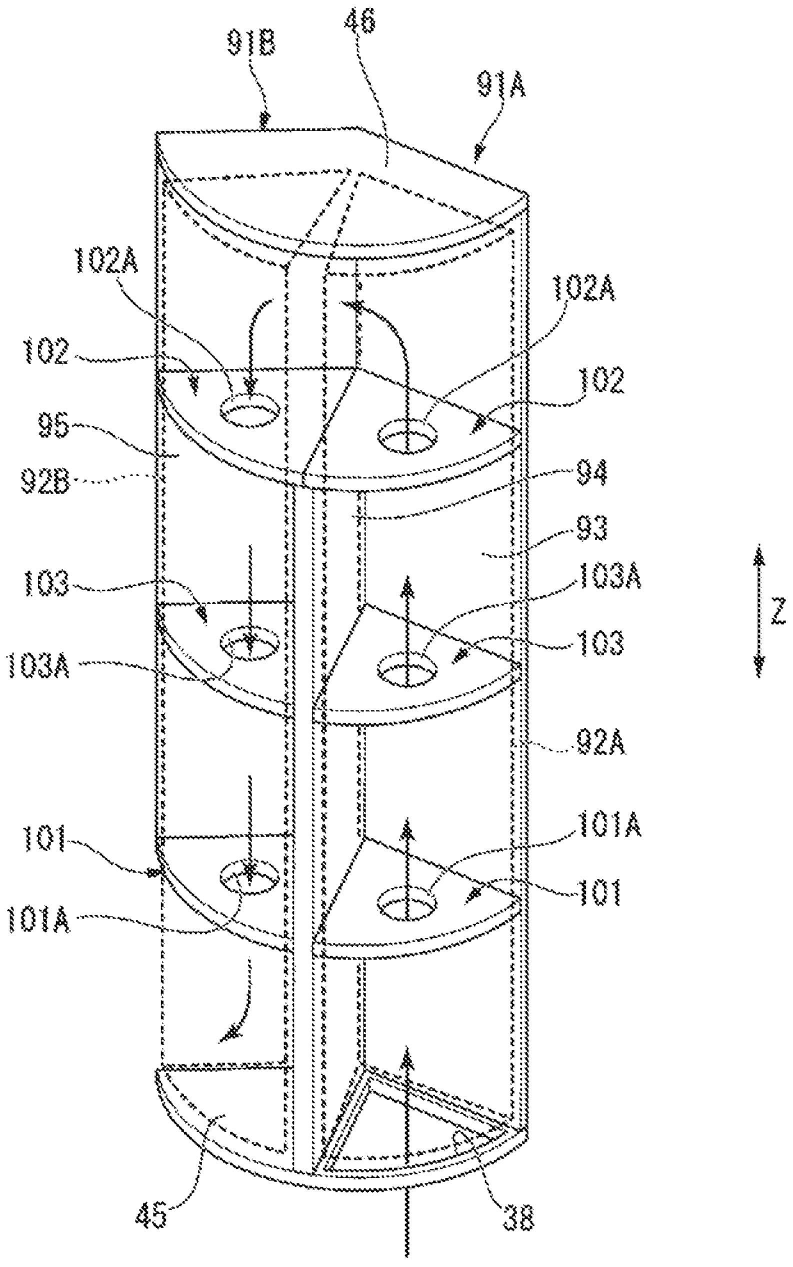
FIG. 23 is a perspective view illustrating an internal structure of two resistance-imparting portions of the five resistance-imparting portions illustrated in FIG. 22.
Figure 24:
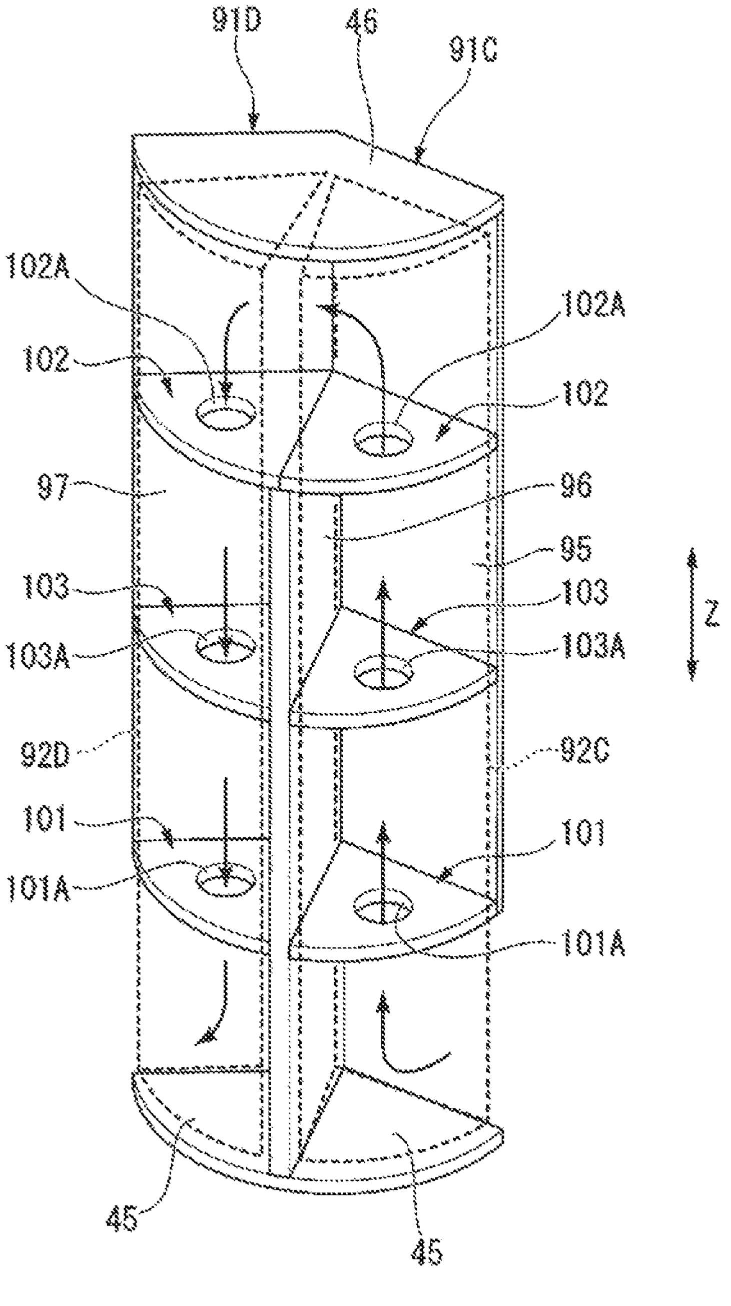
FIG. 24 is a perspective view illustrating an internal structure of two resistance-imparting portions of the three resistance-imparting portions except the resistance-imparting portions illustrated in FIG. 23.
Figure 25:
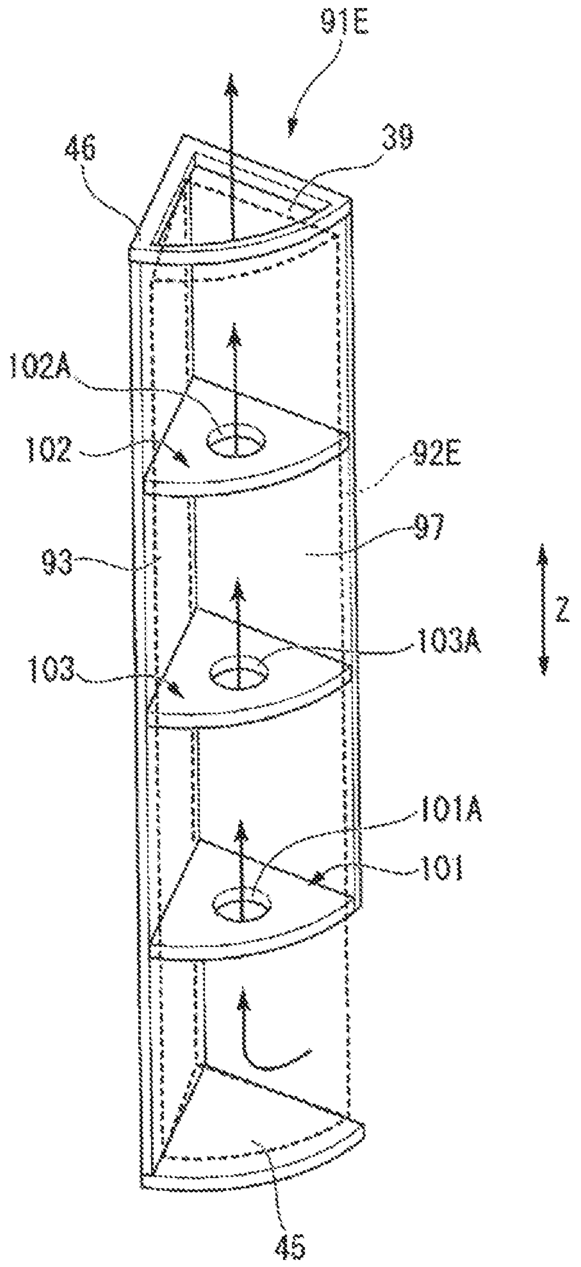
FIG. 25 is a perspective view illustrating an internal structure of the remaining one resistance-imparting portion not illustrated in FIGS. 23 and 24 of the five resistance-imparting portions illustrated in FIG. 22.

A flow path resistor 90 according to a fourth embodiment of the present invention will be described with reference to FIGS. 22 to 25. In FIGS. 22 to 25, the same reference signs are assigned to the same components as the structural bodies illustrated in FIG. 4. Further, in FIG. 22 to FIG. 25, the same reference signs are assigned to the same constituent components. In FIG. 23 to FIG. 25, for convenience of explanation, the outer flame member 31 illustrated in FIG. 22 is not illustrated. The arrows illustrated in FIGS. 23 and 25 indicate directions of movement of the cooling water.

The flow path resistor 90 is formed in the same manner as the flow path resistor 25 except that the flow path resistor 90 includes resistance-imparting portions 91A to 91E instead of the resistance-imparting portions 34A to 34E forming the flow path resistor 25 of the first embodiment, and further includes plate members 93 to 97 housed within the outer frame member 31 and disposed at intervals in the circumferential direction of the outer frame member 31, and that the shapes and positions of the fluid introduction port 38 and the fluid lead-out port 39 are made different from those in the flow path resistor 25.

The resistance-imparting portions 91A to 91E each have a shape extending in the Z direction. The resistance-imparting portions 91A to 91E are disposed in the circumferential direction of the outer frame member 31 in the order of the resistance-imparting portion 91A, the resistance-imparting portion 91B, the resistance-imparting portion 91C, the resistance-imparting portion 91D, and the resistance-imparting portion 91E.

The resistance-imparting portion 91A includes an enlarged diameter portion 92A and first to third partitioning plates 101 to 103. The enlarged diameter portion 92A is partitioned by the plate members 93 and 94 and the first and second plate portions 45 and 46, and extends in the Z direction.

The first partitioning plate 101 is a fan-shaped plate member. The first partitioning plate 101 is disposed above the fan-shaped fluid introduction port 38 and below the outer frame member 31. The first partitioning plate 101 is fixed to the plate members 93 and 94.

The first partitioning plate 101 has a first contraction flow portion 101A formed so as to penetrate the central portion. The cooling water introduced from the fluid introduction port 38 is introduced into the enlarged diameter portion 92A.

The second partitioning plate 102 is a fan-shaped plate member. The second partitioning plate 102 is disposed below the second plate portion 46 and above the outer frame member 31.

The second partitioning plate 102 is fixed to the plate members 94 and 95. The second partitioning plate 102 has a first contraction flow portion 102A formed through the central portion.

The third partitioning plate 103 is a fan-shaped plate member. The third partitioning plate 103 is disposed above the first partitioning plate 101 and in a middle portion of the outer frame member 31 positioned below the second partitioning plate 102.

The third partitioning plate 103 is fixed to the plate members 95 and 96. The third partitioning plate 103 has a first contraction flow portion 103A formed so as to penetrate the central portion.

The cooling water is added with resistance as it passes through the first contraction flow portion 101A. The cooling water that has passed through the first contraction flow portion 103A flows into the enlarged diameter portion 92A positioned between the first partitioning plate 101 and the third partitioning plate 103.

The cooling water that has flowed into the enlarged diameter portion 92A flows through the first contraction flow portion 103A, the enlarged diameter portion 92A positioned between the first partitioning plate 101 and the third partitioning plate 103, and the first contraction flow portion 102A in order, and then flows to an upper end portion of the resistance-imparting portion 91B.

The resistance-imparting portion 91B includes an enlarged diameter portion 92B having a shape similar to that of the enlarged diameter portion 92A, and the first to third partitioning plates 101 to 103. The enlarged diameter portion 92B is partitioned by the plate members 94 and 95 and the first and second plate portions 45 and 46.

The cooling water flowing through the resistance-imparting portion 91A passes through the first contraction flow portion 102A, the first contraction flow portion 103A, and the first contraction flow portion 101A, in this order, which are disposed within the enlarged diameter portion 92B. Thereafter, the cooling water flows to a lower end portion of the resistance-imparting portion 91C.

The resistance-imparting portion 91C includes an enlarged diameter portion 92C having the same shape as that of the enlarged diameter portion 92A, and the first to third partitioning plates 101 to 103. The enlarged diameter portion 92C is partitioned by the plate member 95 and 96 and the first and second plate portions 45 and 46.

The cooling water flowing through the resistance-imparting portion 91B passes through the first contraction flow portion 101A, the first contraction flow portion 103A, and the first contraction flow portion 102A, in this order, which are disposed within the enlarged diameter portion 92C. Thereafter, the cooling water flows to an upper end portion of the resistance-imparting portion 91D.

The resistance-imparting portion 91D includes an enlarged diameter portion 92D having the same shape as that of the enlarged diameter portion 92A, and the first to third partitioning plates 101 to 103. The enlarged diameter portion 92D is partitioned by the plate members 96 and 97 and the first and second plate portions 45 and 46.

The cooling water that has passed through the resistance-imparting portion 91C passes through the first contraction flow portion 102A, the first contraction flow portion 103A, and the first contraction flow portion 101A, in this order, which are disposed within the enlarged diameter portion 92D. Then, the cooling water flows to a lower end portion of the resistance-imparting portion 91E.

The resistance-imparting portion 91E includes an enlarged diameter portion 92E having the same shape as that of the enlarged diameter portion 92A, and the first to third partitioning plates 101 to 103. The enlarged diameter portion 92E is partitioned by the plate members 97 and 93 and the first and second plate portions 45 and 46.

The cooling water that has passed through the resistance-imparting portion 91D passes through the first contraction flow portion 101A, the first contraction flow portion 103A, and the first contraction flow portion 102A in this order, which are disposed within the enlarged diameter portion 92E. Thereafter, the cooling water is drawn out from the fluid lead-out port 39.

The plate member 93 is disposed between the enlarged diameter portion 92A and the enlarged diameter portion 92E. The plate member 93 extends in the Z direction, and one end thereof is connected to the inner surface of the first plate portion 45, and the other end is connected to the inner surface of the second plate portion 46.

By having the plate member 93 formed as described above, the cooling water drawn out from the enlarged diameter portion 92A via the first contraction flow portion 102A and the cooling water introduced from the fluid introduction port 38 can be suppressed from flowing within the resistance-imparting portion 91E.

The plate member 94 is disposed between the enlarged diameter portion 92A and the enlarged diameter portion 92B. The plate member 94 extends in the Z direction. One end of the plate member 94 is connected to the inner surface of the first plate portion 45.

The other end of the plate member 94 is connected to the second partitioning plate 102 forming the resistance-imparting portion 91A and the second partitioning plate 102 forming the resistance-imparting portion 91B so as not to protrude above the second partitioning plate 102.

By having the plate member 94 formed as described above, the cooling water drawn out from the resistance-imparting portion 91A can be introduced into the resistance-imparting portion 91B.

The plate member 95 is disposed between the enlarged diameter portion 92B and the enlarged diameter portion 92C. The plate member 95 extends in the Z direction. One end of the plate member 95 is connected to the first partitioning plate 101 forming the resistance-imparting portion 91B and the first partitioning plate 101 forming the resistance-imparting portion 91C so as not to protrude below the first partitioning plate 101. The other end of the plate member 95 is connected to the inner surface of the second plate portion 46.

By having the plate member 95 formed as described above, the cooling water drawn out from the resistance-imparting portion 91B can be introduced into the resistance-imparting portion 91C.

The plate member 96 is disposed between the enlarged diameter portion 92C and the enlarged diameter portion 92D. The plate member 96 extends in the Z direction. One end of the plate member 96 is connected to the inner surface of the first plate portion 45.

The other end of the plate member 96 is connected to the second partitioning plate 102 forming the resistance-imparting portion 91C and the second partitioning plate 102 forming the resistance-imparting portion 91D so as not to protrude above the second partitioning plate 102.

By having the plate member 96 formed as described above, the cooling water drawn out from the resistance-imparting portion 91C can be introduced into the resistance-imparting portion 91D.

The plate member 97 is disposed between the enlarged diameter portion 92D and the enlarged diameter portion 92E. The plate member 97 extends in the Z direction.

One end of the plate member 97 is connected to the first partitioning plate 101 forming the resistance-imparting portion 91D and the first partitioning plate 101 forming the resistance-imparting portion 91E so as not to protrude below the first partitioning plate 101. The other end of the plate member 97 is connected to the inner surface of the second plate portion 46.

By having the plate member 97 formed as described above, the cooling water that has passed through the resistance-imparting portion 91E can be drawn out from the fluid lead-out port 39 to the outside of the flow path resistor 90.

The flow path resistor 90 of the fourth embodiment has the above-described first to third partitioning plates 101 to 103 and the enlarged diameter portions 92A to 92E, and includes the resistance-imparting portions 91A to 91E disposed in the circumferential direction of the outer frame member 31. Thus, after passing through the first contraction flow portion 101A or the first contraction flow portion 102A, the cooling water flowing through the resistance-imparting portions 91A to 91E can flow in the other resistance-imparting portion adjacent to the resistance-imparting portion.

Thus, the length of the flow path resistor 90 is decreased, and the flow path of the cooling water is then lengthened, thereby making it possible to add a repeating resistance to the cooling water.

In other words, in a case where the resistance-imparting portions 91A to 91D are disposed in the circumferential direction of the outer frame member 31 as in the fourth embodiment, similar effects to those obtained in the case of layering the plurality of resistance-imparting portions in the Z direction as in the first to third embodiments can be obtained.

In the fourth embodiment, an example has been given of the case in which five resistance-imparting portions (resistance-imparting portions 91A to 91E) are disposed in the circumferential direction of the outer frame member 31. However, the number of the resistance-imparting portions that are disposed in the circumferential direction of the outer frame member 31 can be set as appropriate and is not limited to five.

In addition, an example has been given of the case in which one third partitioning plate 103 is provided in the fourth embodiment, but the number of the third partitioning plates 103 may be one or more, and is not limited to one. By providing a plurality of third partitioning plates 103 that partition the enlarged diameter portions 92A to 92E, the number of times of adding resistance to the cooling water can be increased.

Fifth Embodiment

Figure 26:
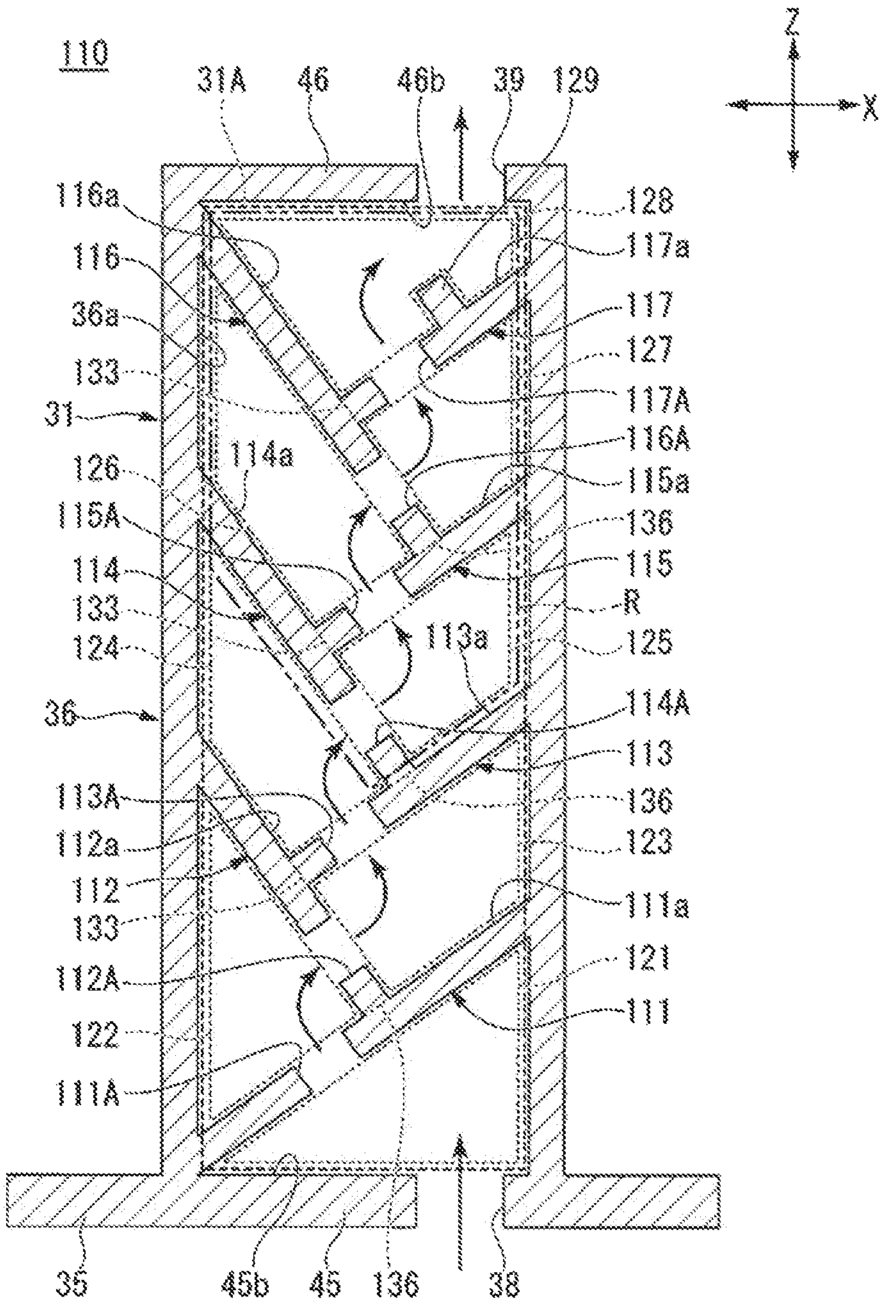
FIG. 26 is a vertical cross-sectional view of a flow path resistor according to a fifth embodiment of the present invention.
Figure 27:
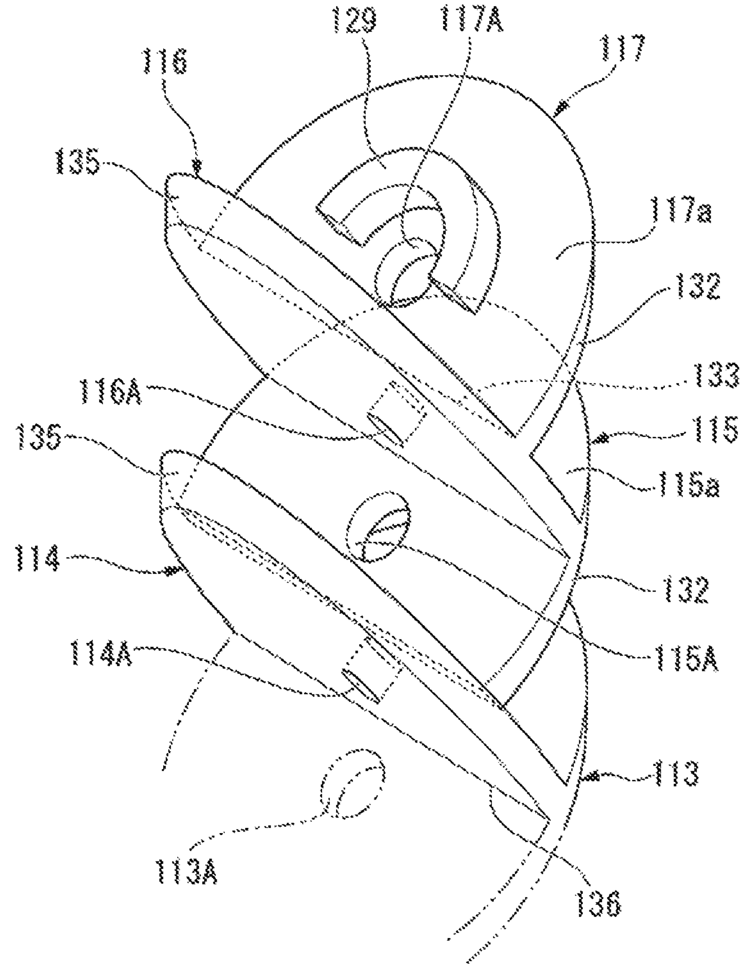
FIG. 27 is a perspective view of a portion surrounded by a region R of the structure illustrated in FIG. 26.

A flow path resistor 110 according to a fifth embodiment of the present invention will be described with reference to FIGS. 26 and 27. In FIGS. 26 and 27, the same reference signs are assigned to the same components as the structural bodies illustrated in FIG. 4. Further, in FIGS. 26 and 27, the same reference signs are assigned to the same constituent components. The arrows illustrated in FIG. 26 indicate directions of movement of the cooling water.

The flow path resistor 110 of the fifth embodiment is formed in the same manner as the flow path resistor 25 except that the flow path resistor 110 includes, instead of the dividing plates 32A to 32D, the ribs 33A to 33E, and the resistance-imparting portions 34A to 34E forming the flow path resistor 25 of the first embodiment, first inclined plates 111, 113, 115, and 117, second inclined plates 112, 114, and 116, enlarged diameter portions 121 to 128, and a rib 129.

The first inclined plates 111, 113, 115, and 117 are housed in the outer frame member 31. The first inclined plates 111, 113, 115, and 117 are disposed at intervals in the order of the first inclined plate 111, the first inclined plate 113, the first inclined plate 115, and the first inclined plate 117 with respect to the direction from the first plate portion 45 toward the second plate portion 46.

The first inclined plates 111, 113, 115, and 117 are inclined at the same angle with respect to the Z direction.

The first inclined plate 111 is a plate member having an elliptical shape. The first inclined plates 113, 115, and 117 are formed by linearly cutting out a portion of a plate member having an elliptical shape.

The first inclined plates 111, 113, 115, and 117 each have a curved portion 132. Each curved portion 132 is connected to an inner peripheral surface 36*a* of the outer frame member main body 36. The first inclined plates 113, 115, and 117 have a straight line portion 133.

The first inclined plate 111 has a first contraction flow portion 111A formed so as to penetrate a portion thereof and through which cooling water, which is a fluid, passes. The first inclined plate 113 has a first contraction flow portion 113A formed so as to penetrate a portion thereof and through which the cooling water passes.

The first inclined plate 115 has a first contraction flow portion 115A formed so as to penetrate a portion thereof and through which the cooling water passes. The first inclined plate 117 has a first contraction flow portion 117A formed so as to penetrate a portion thereof and through which the cooling water passes.

The second inclined plates 112, 114, and 116 are housed in the outer frame member 31. The second inclined plates 112, 114, and 116 are disposed at intervals in the order of the second inclined plate 112, the second inclined plate 114, and the second inclined plate 116 with respect to the direction from the first plate portion 45 toward the second plate portion 46.

The second inclined plates 112, 114, and 116 are inclined to a direction opposite to the inclination direction of the first inclined plates 111, 113, 115, and 117 (one example of a different direction). The second inclined plates 112, 114, and 116 are inclined at the same angle with respect to the Z direction.

The second inclined plates 112, 114, and 116 are formed by linearly cutting out a portion of a plate member having an elliptical shape.

The second inclined plates 112, 114, and 116 have a curved portion 135 and a straight line portion 136. Each curved portion 132 is connected to the inner peripheral surface 36*a* of the outer frame member main body 36.

The second inclined plate 112 has a second contraction flow portion 112A formed so as to penetrate a portion thereof and through which cooling water, which is a fluid, passes.

The second inclined plate 112 is disposed above the first inclined plate 111. The straight line portion 136 of the second inclined plate 112 is connected to an upper surface 111*a* of the first inclined plate 111.

The straight line portion 133 of the first inclined plate 113 is connected to a surface of the upper surface 112*a* of the second inclined plate 112, which is positioned above the second contraction flow portion 112A.

The second inclined plate 114 has a second contraction flow portion 114A formed so as to penetrate a portion thereof and through which cooling water, which is a fluid, passes.

The second inclined plate 114 is disposed above the first inclined plate 113. The straight line portion 136 of the second inclined plate 114 is connected to an upper surface 113*a* of the first inclined plate 113.

The straight line portion 133 of the first inclined plate 115 is connected to a surface of the upper surface 114*a* of the second inclined plate 114, which is positioned above the second contraction flow portion 114A.

The second inclined plate 116 has a second contraction flow portion 116A formed so as to penetrate a portion thereof and through which cooling water, which is a fluid, passes.

The second inclined plate 116 is disposed above the first inclined plate 115. The straight line portion 136 of the second inclined plate 116 is connected to an upper surface 115*a* of the first inclined plate 115.

The straight line portion 133 of the first inclined plate 117 is connected to a surface positioned above the second contraction flow portion 116A of the upper surface 116*a* of the second inclined plate 116.

In a plan view from the fluid lead-out port 39 side, the second contraction flow portions 112A, 114A, and 116A may be formed at different positions than the first contraction flow portions 111A, 113A, 115A, and 117A.

The second contraction flow portions 112A, 114A, and 116A are formed in such positions so that the length of the flow path through which the cooling water passes can be increased. As a result, it is possible to add a large resistance to the cooling water.

The opening areas of the first contraction flow portions 111A, 113A, 115A, and 117A and the second contraction flow portions 112A, 114A, and 116A can be, for example, less than or equal to half of the opening area of the outer frame member main body 36.

The enlarged diameter portion 121 is disposed below the first inclined plate 111. The enlarged diameter portion 121 is partitioned by the first inclined plate 111, the first plate portion 45, and the inner peripheral surface 36*a* of the outer frame member main body 36 positioned below the first inclined plate 111.

The enlarged diameter portion 121 is in communication with the fluid introduction port 38 and the first contraction flow portion 111A. In other words, the cooling water flowing in from the fluid introduction port 38 passes through the enlarged diameter portion 121 and the first contraction flow portion 111A in this order.

The enlarged diameter portion 122 is disposed above the first inclined plate 111 and below the second inclined plate 112. The enlarged diameter portion 122 is partitioned by the first inclined plate 111, the second inclined plate 112, and the inner peripheral surface 36*a* of the outer frame member main body 36 positioned above the first inclined plate 111 and below the second inclined plate 112.

The enlarged diameter portion 122 is in communication with the first contraction flow portion 111A and the second contraction flow portion 112A.

The cooling water that has flowed into the enlarged diameter portion 122 via the first contraction flow portion 111A is drawn out from the enlarged diameter portion 122 via the second contraction flow portion 112A.

The enlarged diameter portion 123 is disposed above the first inclined plate 111 and below the first inclined plate 113. The enlarged diameter portion 122 is partitioned by the first inclined plates 111 and 113, the second inclined plate 112, and the inner peripheral surface 36*a* of the outer frame member main body 36 positioned above the first inclined plate 111 and below the first inclined plate 113.

The enlarged diameter portion 123 is in communication with the second contraction flow portion 112A and the first contraction flow portion 113A.

The cooling water that has flowed into the enlarged diameter portion 123 via the second contraction flow portion 112A is drawn out from the enlarged diameter portion 123 via the first contraction flow portion 113A.

The enlarged diameter portion 124 is disposed above the second inclined plate 112 and below the second inclined plate 114. The enlarged diameter portion 124 is partitioned by the first inclined plate 113, the second inclined plates 112 and 114, and the inner peripheral surface 36*a* of the outer frame member main body 36 positioned above the second inclined plate 112 and below the second inclined plate 114.

The enlarged diameter portion 124 is in communication with the first contraction flow portion 113A and the second contraction flow portion 114A.

The cooling water that has flowed into the enlarged diameter portion 124 via the first contraction flow portion 113A is drawn out from the enlarged diameter portion 124 via the second contraction flow portion 114A.

The enlarged diameter portion 125 is disposed above the first inclined plate 113 and below the first inclined plate 115. The enlarged diameter portion 125 is partitioned by the first inclined plates 113 and 115, the second inclined plate 114, and the inner peripheral surface 36*a* of the outer frame member main body 36 positioned above the first inclined plate 113 and below the first inclined plate 115.

The enlarged diameter portion 125 is in communication with the second contraction flow portion 114A and the first contraction flow portion 115A.

The cooling water that has flowed into the enlarged diameter portion 125 via the second contraction flow portion 114A is drawn out from the enlarged diameter portion 125 via the first contraction flow portion 115A.

The enlarged diameter portion 126 is disposed above the second inclined plate 114 and below the first inclined plate 115. The enlarged diameter portion 126 is partitioned by the first inclined plate 115, the second inclined plates 114 and 116, and the inner peripheral surface 36*a* of the outer frame member main body 36 positioned above the second inclined plate 114 and below the second inclined plate 116.

The enlarged diameter portion 126 is in communication with the first contraction flow portion 115A and the second contraction flow portion 116A.

The cooling water that has flowed into the enlarged diameter portion 125 via the first contraction flow portion 115A is drawn out from the enlarged diameter portion 126 via the second contraction flow portion 116A.

The enlarged diameter portion 127 is disposed above the first inclined plate 115 and below the first inclined plate 117. The enlarged diameter portion 127 is partitioned by the first inclined plates 115 and 117, the second inclined plate 116, and the inner peripheral surface 36*a* of the outer frame member main body 36 positioned above the first inclined plate 115 and below the first inclined plate 117.

The enlarged diameter portion 127 is in communication with the second contraction flow portion 116A and the first contraction flow portion 117A.

The cooling water that has flowed into the enlarged diameter portion 127 via the second contraction flow portion 116A is drawn out from the enlarged diameter portion 127 via the first contraction flow portion 117A.

The enlarged diameter portion 128 is disposed above the first inclined plate 117 and the second inclined plate 116. The enlarged diameter portion 128 is partitioned by the first inclined plate 117, the second inclined plate 116, the second plate portion 46, and the inner peripheral surface 36*a* of the outer frame member main body 36 positioned between the second plate portion 46 and the first inclined plate 127.

The enlarged diameter portion 128 is in communication with the first contraction flow portion 117A and the fluid lead-out port 39. The cooling water that has flowed into the enlarged diameter portion 128 via the first contraction flow portion 117A is drawn out from the enlarged diameter portion 128 via the fluid lead-out port 39.

The rib 129 is provided on an upper surface 117*a* of the first inclined plate 117 positioned near the fluid lead-out port 39.

By providing such the rib 129, the flow path width of the enlarged diameter portion 128 positioned on the fluid lead-out port 39 side can be narrowed. As a result, it is possible to add resistance to the cooling water toward the fluid lead-out port 39.

The flow path resistor 110 of the fifth embodiment includes the first inclined plates 111, 113, 115, and 117, the second inclined plates 112, 114, and 116, the enlarged diameter portion 121 to 128, and the rib 129 described above, and thus can provide similar effects to those of the flow path resistor 25 of the first embodiment.

In addition, by having the first inclined plates 111, 113, 115, and 117 and the second inclined plates 112, 114, and 116 inclined to the Z direction, the strength of the first inclined plates 111, 113, 115, and 117 and the second inclined plates 112, 114, and 116 can be improved in the case where the flow path resistor 110 is manufactured using a 3D printer.

In the fifth embodiment, an example has been given of the case in which the fluid lead-out port 39 is formed at a position apart from the central position of the second plate portion 46, but, for example, the fluid lead-out port 39 may be formed in the central portion of the second plate portion 46.

In addition, in the fifth embodiment, an example has been given of the case in which the first inclined plates 111, 113, 115, and 117 are inclined at the same angle, but the inclination angle of the first inclined plates 111, 113, 115, and 117 may be varied.

In addition, in the fifth embodiment, an example has been given of the case in which the second inclined plates 112, 114, and 116 are inclined at the same angle, but the inclination angle of the second inclined plates 112, 114, and 116 may be varied.

Furthermore, ribs may also be provided on the first inclined plate 111, 113, and 115 and the second inclined plates 112, 114, and 116.

Sixth Embodiment

Figure 28:
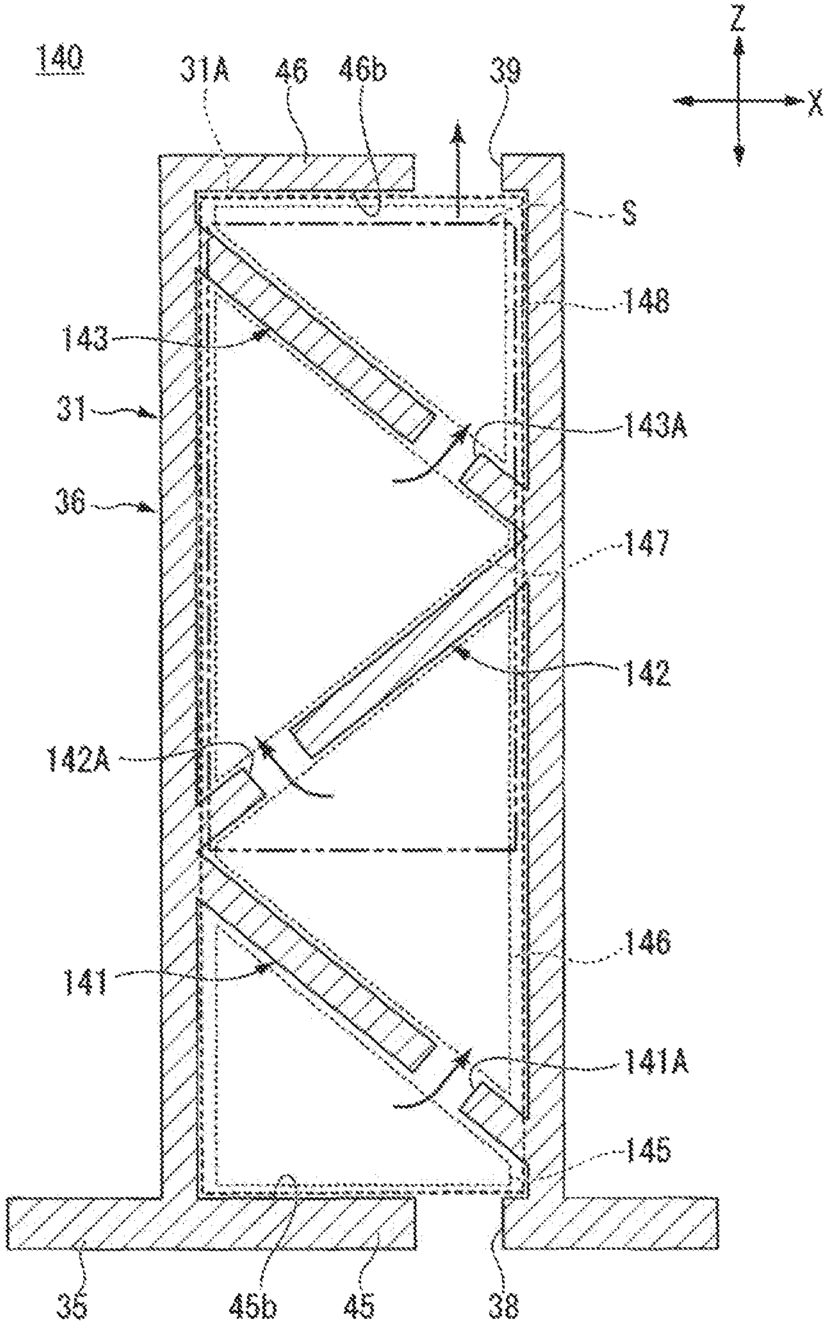
FIG. 28 is a vertical cross-sectional view of a flow path resistor according to a sixth embodiment of the present invention.
Figure 29:
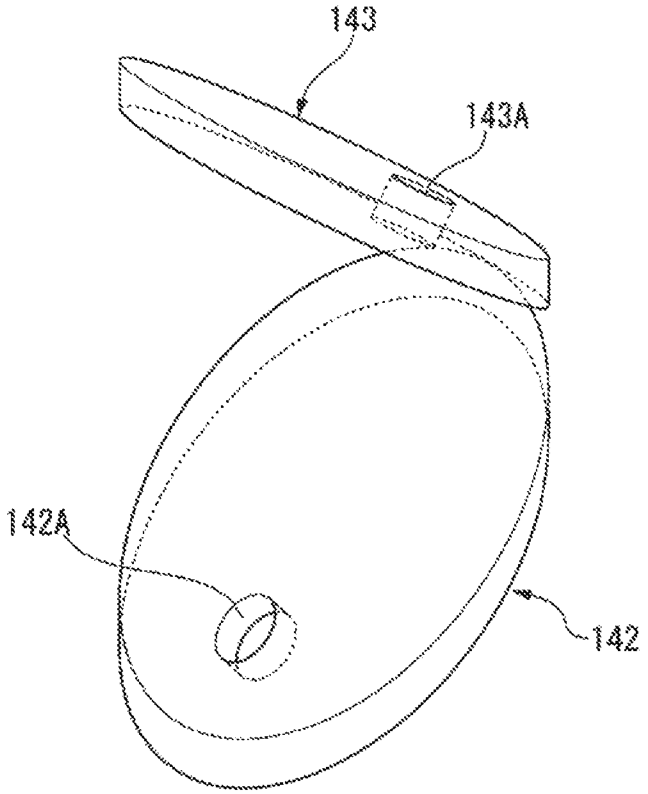
FIG. 29 is a perspective view of a portion surrounded by a region S of the structure illustrated in FIG. 28.

A flow path resistor 140 according to a sixth embodiment of the present invention will be described with reference to FIGS. 28 and 29. In FIGS. 28 and 29, the same reference signs are assigned to the same components as the structural bodies illustrated in FIG. 4. Further, in FIGS. 28 and 29, the same reference signs are assigned to the same constituent components. The arrows illustrated in FIG. 28 indicate directions of movement of the cooling water.

The flow path resistor 140 of the sixth embodiment is formed in the same manner as the flow path resistor 25 except that, instead of the dividing plates 32A to 32D, the ribs 33A to 33E, and the resistance-imparting portions 34A to 34E forming the flow path resistor 25 of the first embodiment, the flow path resistor 140 includes first inclined plates 141 and 143, a second inclined plate 142, and an enlarged diameter portions 145 to 148.

The first inclined plates 141 and 143 are housed in the outer frame member 31. The first inclined plates 141 and 143 are disposed at intervals in the order of the first inclined plate 141 and the first inclined plate 143 with respect to the direction from the first plate portion 45 toward the second plate portion 46.

The first inclined plates 141 and 143 are inclined at the same angle with respect to the Z direction. Each of the first inclined plates 141 and 143 is a plate member having an elliptical shape. The outer peripheral surfaces of the first inclined plates 141 and 143 are connected to the inner peripheral surface 36*a* of the outer frame member main body 36.

The first inclined plate 141 has a first contraction flow portion 141A formed so as to penetrate a portion thereof and through which cooling water, which is a fluid, passes. The first inclined plate 143 has a first contraction flow portion 143A formed so as to penetrate a portion thereof and through which the cooling water passes.

The second inclined plate 142 is housed in the outer frame member 31. The second inclined plate 142 is disposed between the first inclined plate 141 and the first inclined plate 143.

The second inclined plate 142 is inclined to a direction opposite to the inclination direction of the first inclined plates 141 and 143.

The second inclined plate 142 is a plate member having an elliptical shape.

The second inclined plates 112, 114, and 116 have a curved portion 135 and a straight line portion 136. Each curved portion 132 is connected to the inner peripheral surface 36*a* of the outer frame member main body 36.

The second inclined plate 142 has a second contraction flow portion 142A formed so as to penetrate a portion thereof and through which cooling water, which is a fluid, passes.

The second inclined plate 142 is disposed between the first inclined plate 141 and the first inclined plate 143.

In a plan view from the fluid lead-out port 39 side, the second contraction flow portion 142A may be formed at a position different from the first contraction flow portions 141A and 143A.

The second contraction flow portion 142A is formed in such a position, and thus the length of the flow path through which the cooling water passes can be increased. As a result, it is possible to add a large resistance to the cooling water.

The opening areas of the first contraction flow portions 141A and 143A and the second contraction flow portion 142A can be, for example, less than or equal to half of the opening area of the outer frame member main body 36.

The enlarged diameter portion 145 is disposed below the first inclined plate 141. The enlarged diameter portion 145 is partitioned by the first inclined plate 141, the first plate portion 45, and the inner peripheral surface 36*a* of the outer frame member main body 36 positioned below the first inclined plate 141.

The enlarged diameter portion 145 is in communication with the fluid introduction port 38 and the first contraction flow portion 141A. In other words, the cooling water flowing in from the fluid introduction port 38 passes through the enlarged diameter portion 145 and the first contraction flow portion 141A in this order.

The enlarged diameter portion 146 is disposed between the first inclined plate 141 and the second inclined plate 142. The enlarged diameter portion 146 is partitioned by the first inclined plate 141, the second inclined plate 142, and the inner peripheral surface 36*a* of the outer frame member main body 36 positioned above the first inclined plate 141 and below the second inclined plate 142.

The enlarged diameter portion 146 is in communication with the first contraction flow portion 141A and the second contraction flow portion 142A.

The cooling water that has flowed into the enlarged diameter portion 146 via the first contraction flow portion 141A is drawn out from the enlarged diameter portion 146 via the second contraction flow portion 142A.

The enlarged diameter portion 147 is disposed between the second inclined plate 142 and the first inclined plate 143. The enlarged diameter portion 147 is partitioned by the first inclined plate 143, the second inclined plate 142, and the inner peripheral surface 36*a* of the outer frame member main body 36 positioned between the first inclined plate 143 and the second inclined plate 142.

The enlarged diameter portion 147 is in communication with the second contraction flow portion 142A and the first contraction flow portion 143A.

The cooling water that has flowed into the enlarged diameter portion 143 via the second contraction flow portion 142A is drawn out from the enlarged diameter portion 147 via the first contraction flow portion 143A.

The enlarged diameter portion 148 is disposed between the first inclined plate 143 and the second plate portion 46. The enlarged diameter portion 148 is partitioned by the first inclined plate 143, the second plate portion 46, and the inner peripheral surface 36*a* of the outer frame member main body 36 positioned above the first inclined plate 143 and below the second plate portion 46.

The enlarged diameter portion 148 is in communication with the first contraction flow portion 143A and the fluid lead-out port 39. The cooling water that has flowed into the enlarged diameter portion 148 via the first contraction flow portion 143A is drawn out from the enlarged diameter portion 148 via the fluid lead-out port 39.

The flow path resistor 140 of the sixth embodiment formed as described above can provide similar effects to those of the flow path resistor 110 of the fifth embodiment described above.

In the sixth embodiment, an example has been given of the case in which the fluid lead-out port 39 is formed at a position apart from the central position of the second plate portion 46, but, for example, the fluid lead-out port 39 may be formed in the central portion of the second plate portion 46.

In addition, in the fifth embodiment, an example has been given of the case in which the first inclined plates 111, 113, 115, and 117 are inclined at the same angle, but the inclination angle of the first inclined plates 111, 113, 115, and 117 may be varied.

In addition, in the sixth embodiment, an example is given of the case in which one second inclined plate 142 is provided, but a plurality of second inclined plates 142 may be provided at intervals in the Z direction. In this case, the inclination angles of the plurality of second inclined plates 142 may be the same, or the inclination angles thereof may be different.

Furthermore, by providing ribs on the first inclined plates 141 and 143 and the second inclined plate 142, the enlarged diameter portions 145 to 148 may be partially narrowed.

Although preferable embodiments of the present invention have been described above in detail, the present invention is not limited to those specific embodiments. Various modifications and changes can be made to the embodiments without departing from the scope and spirit of the present invention as described in the claims.

For example, in the first to sixth embodiments, examples have been described in which the flow path resistor 25, 60, 65, 75, 90, 110, or 140 is applied to the heat transfer tube 14 forming the heat exchanger. However, the flow path resistors 25, 60, 65, 75, 90, 110, and 140 can be applied to other than the heat transfer tube 14.

The flow path resistors 25, 60, 65, 75, 90, 110, and 140 may be applied to a duct, for example. Thus, the flow path resistors 25, 60, 65, 75, 90, 110, and 140 are applied to the duct, thereby making it possible to reduce the flow rate of air (fluid) blown from the duct and reduce noise due to the air blown from the duct.

INDUSTRIAL APPLICABILITY

The present invention is applicable to flow path resistors and heat exchangers.

REFERENCE SIGNS LIST

10 Heat exchanger
11 Casing
11A Casing main body
11AB Space
13 Tube support plate
14 Heat transfer tube
14A One end portion
14B Another end portion
15 Planar member
16 Cooling water supply chamber
17 Cooling water collection chamber
22 Cooling water introduction port
24 Cooling water lead-out port
25, 60, 65, 75, 90, 110, 140 Flow path resistor
26 Support plate main body
26*a*, 111*a* to 117*a* Upper surface
26A First region
26*b* Lower surface
26B Second Region
28A First through-hole
28B Second through-hole
31 Outer frame member
31*a*, 45*a*, 46*a* Outer surface
31A Hollow portion
32A to 32D Dividing plate
32Aa, 32Ab, 32Ba, 32Bb, 32Ca, 32Cb, 32Da, 32Db Surface
32AH, 32BH, 32CH, 32DH, 101A, 102A, 103A, 111A, 113A, 115A, and 117A, 141A, 143A First contraction flow portion
33A to 33E, 62, 129 Rib
34A to 34E, 61, 69A to 69E, 77A to 77E, 91A to 91E Resistance-imparting portion
35 Protruding portion
36 Outer frame member main body
36*a* Inner peripheral surface
38 Fluid introduction port
39 Fluid lead-out port
43 Cylinder portion
43*a* Outer peripheral surface
45 First plate portion

45*b*, 46*b* Inner surface
46 Second plate portion
51 to 55, 121 to 128, 145 to 148 Enlarged diameter portion
51A, 52A, 53A, 54A, 55A First portion
51B, 52B, 53B, 54B, 55B Second portion
51C, 52C, 53C, 54C, 55C Third portion
66, 81A to 81C, 82A to 82C, 83A to 83C, 84A to 84C, 85A to 85C Partitioning plate
66A, 81BH, 81CH, 82BH, 82BH, 83BH, 83CH, 84BH, 84CH, 85BH, 85CH,
112A, 114A, 116A, 142A Second contraction flow portion
93 to 97 Plate member
101 First partitioning plate
102 Second partitioning plate
103 Third partitioning plate
111, 113, 115, 117, 141, 143 First inclined plate
112, 114, 116, 142 Second inclined plate
132, 135 Curved portion
133, 136 Straight line portion
A, K, R, S Region
Gp Compressed gas
Wc cooling water

The invention claimed is:

1. A flow path resistor comprising:

an outer frame member configured to partition a fluid introduction port formed at one end of the outer frame member, the fluid introduction port being configured to introduce fluid, a fluid lead-out port formed at another end of the outer frame member, the fluid lead-out port being configured to draw out the fluid, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, wherein the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends, wherein the plurality of resistance-imparting portions are disposed in the direction in which the outer frame member extends, a plurality of dividing plates configured to divide the hollow portion in the direction in which the outer frame member extends are provided in the outer frame member, of the plurality of dividing plates adjacent to each other, one of the plurality of dividing plates is formed with the first contraction flow portion forming the one of the plurality of resistance-imparting portions, and another one of the plurality of dividing plates is formed with the first contraction flow portion forming the another one of the plurality of resistance-imparting portions, and the enlarged diameter portion is disposed between the plurality of dividing plates adjacent to each other, and wherein at least one of the plurality of dividing plates adjacent to each other is provided with a rib configured to narrow a flow path of the fluid flowing through the enlarged diameter portion.

2. The flow path resistor according to claim 1, wherein the fluid introduction port and the fluid lead-out port are sized to function as a contraction flow portion configured to contract flow of the fluid, the fluid introduction port forms, of the plurality of resistance-imparting portions, a portion of one of the plurality of resistance-imparting portions disposed on one end portion of the outer frame member, and the fluid lead-out port forms, of the plurality of resistance-imparting portions, a portion of one of the plurality of resistance-imparting portions disposed on another end portion of the outer frame member.

3. The flow path resistor according to claim 1, wherein the plurality of dividing plates adjacent to each other are provided with at least one partitioning plate configured to partition the enlarged diameter portion, and each of the partitioning plates is formed with a second contraction flow portion configured to contract flow of the fluid.

4. A flow path resistor comprising:

an outer frame member configured to partition a fluid introduction port formed at one end of the outer frame member, the fluid introduction port being configured to introduce fluid, a fluid lead-out port formed at another end of the outer frame member, the fluid lead-out port being configured to draw out the fluid, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, wherein the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends, wherein the plurality of resistance-imparting portions extend in the direction in which the outer frame member extends, the plurality of resistance-imparting portions being disposed in a circumferential direction of the outer frame member, the plurality of resistance-imparting portions each include a first partitioning plate disposed on the fluid introduction port side, the plurality of resistance-imparting portion being formed with the first contraction flow portion, and a second partitioning plate disposed on the fluid lead-out port side, the second partitioning plate being formed with the first contraction flow portion, the first and second partitioning plates divide the enlarged diameter portion extending in the direction in which the outer frame member extends, a circumferential direction of the enlarged diameter portion is partitioned by a plate member disposed in a circumferential direction of the outer frame member, and the fluid flowing through one of the plurality of resistance-imparting portions flows through the first partitioning plate or the second partitioning plate and then flows within another one of the plurality of resistance-imparting portions adjacent to the one of the plurality of resistance-imparting portions.

5. The flow path resistor according to claim 4, wherein at least one third partitioning plate is disposed between the first partitioning plate and the second partitioning plate, and the third partitioning plate is formed with the first contraction flow portion.

6. A flow path resistor comprising:

an outer frame member configured to partition a fluid introduction port formed at one end of the outer frame member, the fluid introduction port being configured to introduce fluid, a fluid lead-out port formed at another end of the outer frame member, the fluid lead-out port being configured to draw out the fluid, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, wherein the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends, wherein the fluid lead-out port is disposed in a central portion of the another end of the outer frame member.

7. A flow path resistor comprising:

an outer frame member configured to partition a fluid introduction port formed at one end of the outer frame member, the fluid introduction port being configured to introduce fluid, a fluid lead-out port formed at another end of the outer frame member, the fluid lead-out port being configured to draw out the fluid, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, wherein the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends, wherein the flow path resistor includes a protruding portion that is provided on an outer peripheral surface of the outer frame member positioned on the one end side and the protruding portion protrudes from the outer peripheral surface to an outer side of the outer frame member.

8. A flow path resistor comprising:

an outer frame member configured to partition a fluid introduction port formed at one end of the outer frame member, the fluid introduction port being configured to introduce fluid, a fluid lead-out port formed at another end of the outer frame member, the fluid lead-out port being configured to draw out the fluid, and a hollow portion configured to communicate the fluid introduction port and the lead-out port, the outer frame member extending in one direction; and a plurality of resistance-imparting portions disposed inward of an outer surface of the outer frame member, the plurality of resistance-imparting portions including a first contraction flow portion configured to contract flow of the fluid, and an enlarged diameter portion disposed in the hollow portion and being configured to communicate with the first contraction flow portion, wherein the plurality of resistance-imparting portions are disposed adjacent to each other, of the plurality of resistance-imparting portions adjacent to each other, the first contraction flow portion forming one of the plurality of resistance-imparting portions is in communication with the enlarged diameter portion forming another one of the plurality of resistance-imparting portions, and a plurality the first contraction flow portions forming the plurality of resistance-imparting portions adjacent to each other are disposed at different positions in a direction in which the outer frame member extends, wherein the flow path resistor further comprising:

a plurality of first inclined plates housed in the outer frame member and disposed at intervals in the one direction, the plurality of first inclined plates being formed with the first contraction flow portion, and a plurality of second inclined plates housed in the outer frame member and disposed at intervals in the one direction, the plurality of second inclined plates being formed with the second contraction flow portion, wherein the plurality of first inclined plates are disposed inclined to the one direction, the plurality of second inclined plates are inclined to a direction different from the direction in which the plurality of first inclined plates are inclined, the enlarged diameter portion is partitioned by the first inclined plate, the second inclined plate, and an inner surface of the outer frame member to form a plurality of the enlarged diameter portions, and the first and second contraction flow portions are in communication with the enlarged diameter portion.

9. The flow path resistor according to claim 8, wherein the plurality of second inclined plates are connected to the plurality of first inclined plates disposed in the one direction.

10. The flow path resistor according to claim 8, wherein the plurality of second inclined plates are disposed away from the plurality of first inclined plates disposed in the one direction.

11. The flow path resistor according to claim 8, wherein the first contraction flow portion and the second contraction flow portion are formed at different positions in a plan view from the fluid lead-out port side.

12. The flow path resistor according to claim 8, wherein a rib is provided on at least one of the plurality of first and second inclined plates.

13. A heat exchanger comprising:

the plurality of flow path resistors according to claim 1;

a cylindrical casing having a gas introduction port configured to introduce a gas and a gas lead-out port configured to draw out the gas;

a tube support plate disposed at a bottom portion of the casing, the tube support plate being formed with a plurality of first and second through-holes;

a planar member provided between the tube support plate and the bottom portion of the casing, the planar member being configured to separate a cooling water supply chamber configured to expose a plurality of the first through-holes and a cooling water collection chamber configured to expose a plurality of the second through-holes;

a plurality of heat transfer tubes of which one end portions are inserted into the plurality of first through-holes and another end portions are inserted into the plurality of second through-holes, the plurality of heat transfer tubes having an inverted U-shape;

a cooling water introduction port provided in the casing, the cooling water introduction port provided being configured to introduce cooling water, which is the fluid, to the cooling water supply chamber; and a cooling water lead-out port provided in the casing, the cooling water lead-out port being configured to draw out the cooling water from the cooling water collection chamber, wherein the flow path resistor is mounted in one end portion of the heat transfer tube from the one end side of the heat transfer tube, among the plurality of heat transfer tubes.

14. The heat exchanger according to claim 13, wherein the plurality of flow path resistors are provided in the plurality of heat transfer tubes, and the plurality of flow path resistors mounted in one end portions of the plurality of heat transfer tubes vary in number of the plurality of resistance-imparting portions forming the plurality of flow path resistors depending on a pressure of the cooling water introduced into the one end portions of the plurality of heat transfer tubes.

* * * * *